United States Patent
Graham et al.

(10) Patent No.: US 12,336,619 B2
(45) Date of Patent: Jun. 24, 2025

(54) BACKPACK AND LUMBAR PAD

(71) Applicant: OSPREY PACKS, INC., Cortez, CO (US)

(72) Inventors: John Christopher Graham, Kendal (GB); Michael Paul Pfotenhauer, Dolores, CO (US)

(73) Assignee: OSPREY PACKS, INC., Cortez, CO (US)

( * ) Notice: Subject to any disclaimer, the term of this patent is extended or adjusted under 35 U.S.C. 154(b) by 323 days.

(21) Appl. No.: 17/795,180

(22) PCT Filed: Jan. 29, 2021

(86) PCT No.: PCT/US2021/015679
§ 371 (c)(1),
(2) Date: Jul. 25, 2022

(87) PCT Pub. No.: WO2021/155125
PCT Pub. Date: Aug. 5, 2021

(65) Prior Publication Data
US 2023/0078987 A1 Mar. 16, 2023

Related U.S. Application Data

(60) Provisional application No. 62/968,325, filed on Jan. 31, 2020.

(51) Int. Cl.
*A45F 3/04* (2006.01)
*A45F 3/12* (2006.01)

(52) U.S. Cl.
CPC ........ *A45F 3/047* (2013.01); *A45F 2003/045* (2013.01); *A45F 2003/122* (2013.01); *A45F 2003/127* (2013.01)

(58) Field of Classification Search
CPC ............... A45C 3/047; A45F 2003/122; A45F 2003/125; A45F 2003/127
(Continued)

(56) References Cited

U.S. PATENT DOCUMENTS 5,725,139 A * 3/1998 Smith ...................... A45F 3/02
224/637
10,485,690 B2 * 11/2019 Ernst, Jr. ................... A45F 3/04
(Continued)

FOREIGN PATENT DOCUMENTS

KR 20150125180 11/2015

OTHER PUBLICATIONS

CN206950266U; "Multifunctional Waist Protecting Belt"; Jiang, Jian; Feb. 2, 2018 (Year: 2018).*

*Primary Examiner* — Nathan J Newhouse
*Assistant Examiner* — Lester L Vanterpool

(57) ABSTRACT

Backpacks having lumbar pads as at least one component that has been manufactured using 3D printing or other additive manufacturing technologies. backpack may include 3D manufactured parts including a lumbar pad, shoulder harness, hip belt, or back panel. The component or lumbar pad may include a lattice structure that allows airflow or provides cushioning. The lattice structure may: have multiple layers, include a network of beams and nodes (e.g., that create cells), or be monolithic. The cells may be polygons (e.g., hexagonal) or cells may line up in multiple layers of lattice structure. Cells that line up may have equal numbers of sides. Other embodiments include systems for providing custom backpacks where consumers enter consumer body dimension(s) and the system fabricates a custom backpack or component using the body dimension or desired load capacity, for example, using 3D printing.

17 Claims, 26 Drawing Sheets

(58) Field of Classification Search
USPC .......................................... 224/625, 642, 644
See application file for complete search history.

(56) References Cited

U.S. PATENT DOCUMENTS

| | | | |
|---|---|---|---|
| 2005/0040684 A1* | 2/2005 | Yoshiguchi | ............... A45F 3/12 |
| | | | 297/228.13 |
| 2016/0235158 A1* | 8/2016 | DesJardins | ............ A43B 17/14 |
| 2018/0111013 A1* | 4/2018 | Colorado | ................. A62B 9/04 |
| 2019/0092196 A1* | 3/2019 | Prozzi | .................. B60N 2/5642 |

* cited by examiner

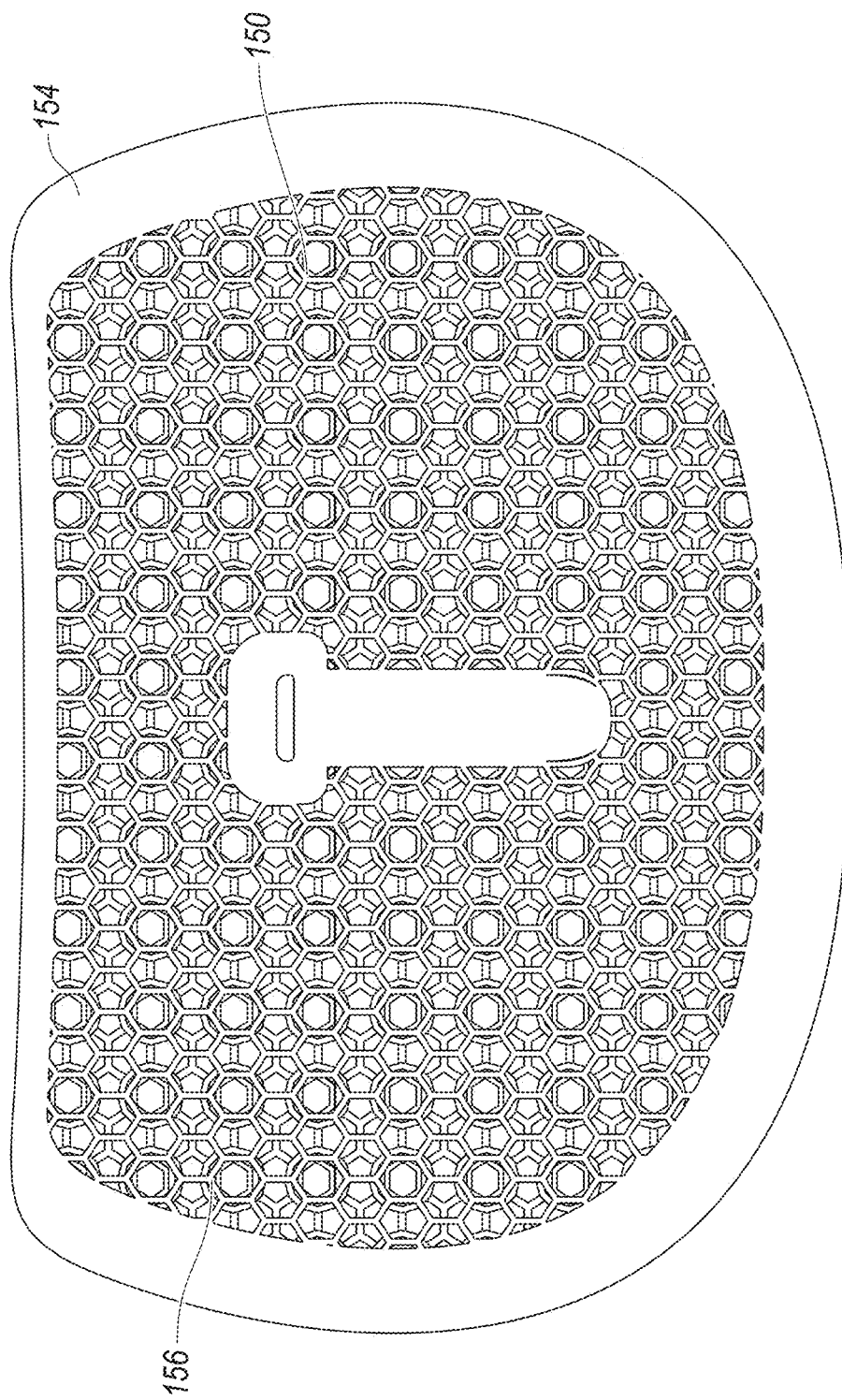

BACKPACK AND LUMBAR PAD

CROSS-REFERENCE TO RELATED APPLICATION

The present application claims priority to U.S. Provisional Patent Application Ser. No. 62/968,325, filed Jan. 31, 2020, which is incorporated herein by reference as if set out in full.

TECHNICAL FIELD

Various embodiments of the technology described herein relate to backpacks, for example, backpacks used to carry items on a person's back, for instance, while hiking. Specific embodiments relate to lumbar pads (e.g., for backpacks). Further, some embodiments concern ventilation, 3D printing, lattice structures, flexible structures, or a combination thereof (e.g., associated with backpacks, lumbar pads, or both), as examples.

BACKGROUND

Various backpacks have been designed and used including backpacks with lumbar pads that support a portion of the weight of the pack on the user's lumbar region of the user's back. In addition, it has been known that perspiration can accumulate between the backpack and various parts of the user's body, including the user's back, for example, particularly while the user is exercising (e.g., hiking). Furthermore, backpacks have been designed and used that provide for airflow between the body of the backpack and the user's body to provide ventilation to the user's body, including for the user's back. Moreover, backpacks have been designed and used that provide surfaces that contact the user's body, including lumbar pads, that are flexible, for example, to provide comfortable force distribution to the user's body (e.g., back or lumbar region thereof). Further, in the past, manufacturing techniques have limited beneficial results that could be achieved, including in backpacks and lumbar pads, and including results that include providing ventilation, providing flexibility, and providing comfortable force distribution to the user's body.

Room for improvement exists over the prior art, however, in these areas including in the design and manufacture of backpacks and lumbar pads and providing ventilation, flexibility, and comfortable force distribution to the user's body. Needs or potential areas for benefit exist in these areas individually as well as in various combinations of these areas, as further examples. Moreover, room for improvement exists over the prior art in the use of various manufacturing techniques including 3D (or additive) printing. Potential for benefit or improvement exists in these and other areas that may be apparent to a person of skill in the art having studied this document.

SUMMARY

Various embodiments are or include backpacks, lumbar pads, backpacks with lumbar pads (e.g., components that support a significant portion of the weight of the pack on the user's lumbar region of the user's back), and various manufacturing techniques, for example, that include 3D printing or other forms of additive manufacturing. Further, various embodiments address perspiration that can accumulate between the backpack and various parts of the user's body, including the user's back, for example, particularly while the user is exercising (e.g., hiking or climbing). Still further, various embodiments provide for airflow between the body of the backpack and the user's body, for example, to provide ventilation to the user's body. Further still, in a number of embodiments, ventilation is provided specifically for the user's back. Even further, various backpacks provide surfaces that contact the user's body. Even further still, various embodiments include lumbar pads for example, that are flexible, provide comfortable force distribution to the user's body (e.g., back or lumbar region), or both. Further, various embodiments include manufacturing techniques that have beneficial results, including techniques used in the manufacture of backpacks, lumbar pads, or a combination thereof. Moreover, some manufacturing techniques provide ventilation, flexibility, comfortable force distribution to the user's body, or a combination thereof, as examples. Even further, certain embodiments include 3D printing or components made using 3D printing (e.g., backpack components, for instance, lumbar pads).

Specific embodiments include various backpacks for carrying items on the back of a user. In a number of embodiments, for example, the backpack includes at least one component that has been manufactured using 3D printing. In different embodiments, this component may be or include a lumbar pad, at least part of a shoulder harness, at least part of a hip belt, at least part of a back panel, or a combination thereof, as examples. Further, various embodiments include (e.g., whether made using 3D printing or not) a lumbar pad, a shoulder harness, a hip belt, a back panel, or a combination thereof. Further still, some embodiments include a (e.g., three-dimensional) back panel, a body (e.g., for containing the items), a mesh panel, a plastic sheet, multiple foam pads, or a combination thereof. For example, in certain embodiments the three-dimensional back panel creates a space between the mesh panel and the plastic sheet, for instance, using the multiple foam pads to separate the body of the backpack from the user's back.

Other specific embodiments include a lumbar pad for supporting a load on the lumbar region of a user where the lumbar pad has been manufactured using 3D printing. Further, in various embodiments, the component or lumbar pad is shaped like an isosceles trapezoid or like a rounded isosceles trapezoid. Still further, in some embodiments, the component or lumbar pad is mounted on a stiff foam framesheet or on a suspended trampoline back panel, as examples. Even further, in a number of embodiments, the component or lumbar pad provides variable resistance, cushioning, weight transfer, or a combination thereof, for example, to the lower back of the user.

In some embodiments, the component or lumbar pad includes a lattice structure. Further, in various embodiments, the lattice structure allows airflow (e.g., for ventilation), for instance, between the backpack or lumbar pad and the user's body. Still further, in a number of embodiments, the lattice structure provides cushioning. Even further, in some embodiments, the component or lumbar pad includes multiple layers of lattice structure. For example, in various embodiments, the component or lumbar pad includes at least three layers of lattice structure, at least four layers of lattice structure, or at least five layers of lattice structure. Further still, in particular embodiments, the component or lumbar pad includes two layers of lattice structure, three layers of lattice structure, four layers of lattice structure, or five layers of lattice structure, as examples.

In a number of embodiments, the component or lumbar pad includes a network of beams and nodes, for example, that create cells. Further, in some embodiments, the beams connect to each other at the nodes, the beams and nodes are monolithic, or both. Still further, in various embodiments, the cells are triangular, rectangular, square, pentagonal, hexagonal, heptagonal, octagonal, nonagonal, or decagonal, as examples. Even further, in a number of embodiments, the cells are (e.g., regular) polygons. Further still, in some embodiments, the component or lumbar pad includes multiple layers of lattice structure and the cells substantially line up in the multiple layers of lattice structure. Even further still, in particular embodiments, cells that substantially line up have equal numbers of sides or, in certain embodiments, at least a majority of cells that substantially line up have equal numbers of sides or at least 80 percent of cells that substantially line up have equal numbers of sides, as examples.

In many embodiments, the component or lumbar pad is anatomically shaped to match and fit the shape of the user's body. Further, in a number of embodiments, the component or lumbar pad is attached to a rigid plate. Further still, in some embodiments, the component or lumbar pad is attached to an open mesh. Still further, in particular embodiments, the component or lumbar pad is attached to a foam base. Even further, in various embodiments, the component or lumbar pad is attached with adhesive, lugs, buttons, at least one strap, or a combination thereof, as examples. Even further still, in some embodiments, the component or lumbar pad includes a center with an elongated hole in the center. Moreover, in particular embodiments, the elongated hole in the center is oriented vertically (e.g., when the backpack is being worn by the user and the user is standing upright).

Still further specific embodiments include various systems for providing custom (e.g., size) backpacks. In various embodiments, for example, the system for providing custom (e.g., size) backpacks provides backpacks or lumbar pads, as examples. Further, in a number of embodiments, the system includes a website, for instance, where consumers enter through the website at least one consumer body dimension. Still further, in various embodiments, the system fabricates at least one component of a custom backpack using the at least one consumer body dimension (e.g., entered by the consumer). Even further, in particular embodiments, consumers enter (e.g., via the website) a desired load capacity of the backpack and the system fabricates at least one component of the custom backpack using the desired load capacity of the backpack (e.g., provided by the consumer). In various embodiments, the system fabricates the at least one component of the custom backpack using 3D printing. Even further still, in a number of embodiments, the at least one component of the custom backpack comprises a lumbar pad. In addition, various other embodiments of the technology are also described herein, and other benefits of certain embodiments are described herein or may be apparent to a person of skill in this area of technology.

BRIEF DESCRIPTION OF THE DRAWINGS

FIGS. 29A-D are views of a lumbar pad consistent with the technology of the present application.

Figure 1:
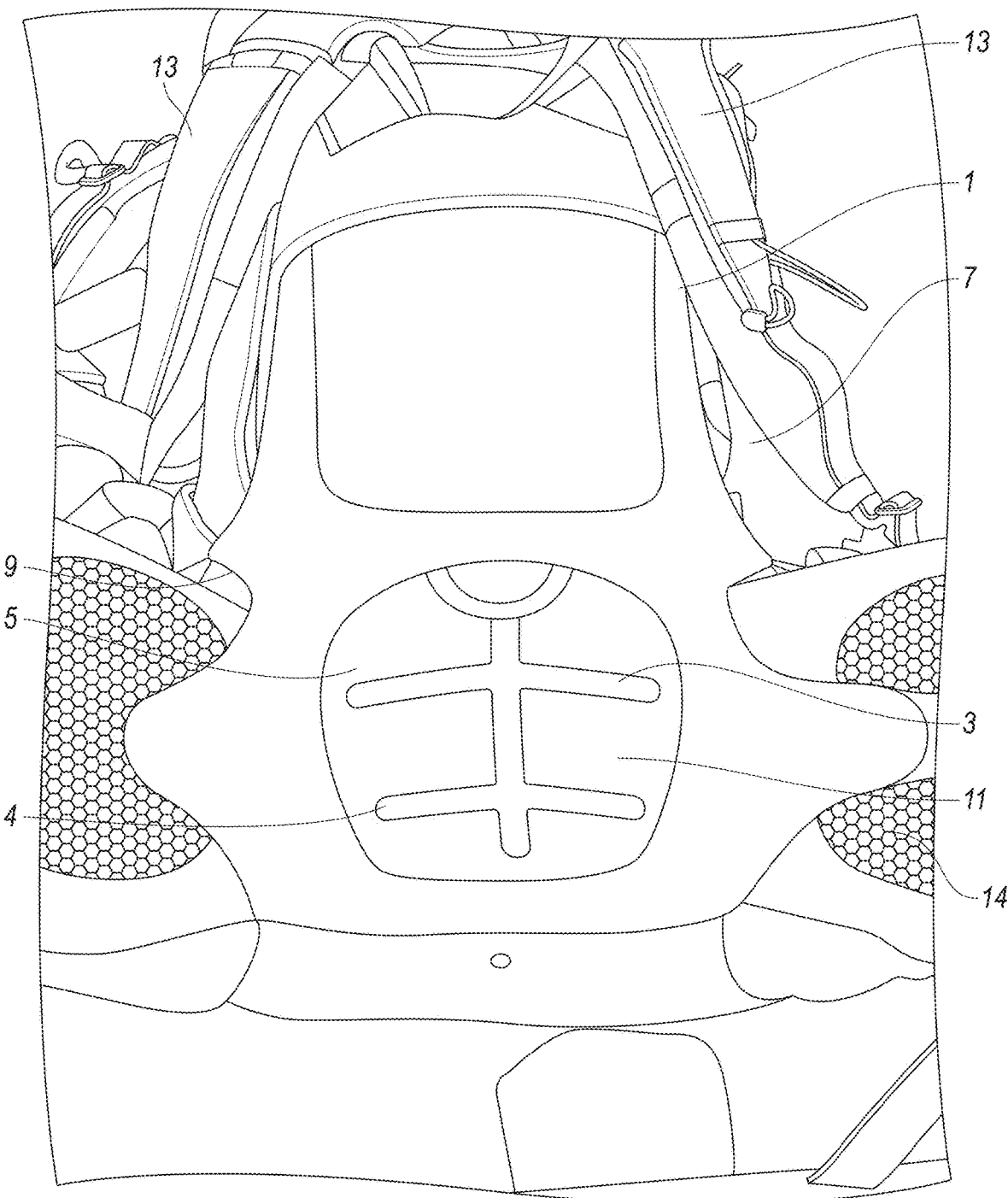
FIGS. 1 and 2 are photographs illustrating examples of backpacks and showing examples of lumbar pads on backpacks.

The drawings provided herewith illustrate, among other things, examples of certain aspects of particular embodiments. Other embodiments may differ. Some embodiments include a portion of the components or acts illustrated. Further, various embodiments may include aspects shown in the drawings, described in the specification (including the claims), known in the art, or a combination thereof, as examples.

DETAILED DESCRIPTION

This patent application describes, among other things, examples of certain embodiments, and certain aspects of the technology relating to pads for backpacks and other articles of manufacture thereof. Other embodiments may differ from the particular examples described in detail herein. Various embodiments of the technology are or concern backpacks, lumbar supports or lumbar pads, backpacks with lumbar pads (e.g., components that support a significant portion of the weight of the pack on the user's lumbar region of the user's back). Further, various embodiments include, or are produced using, certain manufacturing techniques, for example, that include 3D printing or similar additive manufacturing processes. Further, various embodiments remove or reduce the accumulation of perspiration, for example, that can accumulate between the backpack and part of the user's body, for example, the user's back, for instance while the user is exercising (e.g., hiking, walking, riding, or climbing). Various embodiments provide airflow between the body of the backpack and the user's body, which may provide ventilation to the user's body (e.g., to the user's back). Various embodiments include lumbar pads or supports that are flexible, provide force distribution to the user's body (e.g., back or lumbar region), or both. Moreover, various manufacturing techniques provide ventilation, flexibility, force distribution to the user's body, or a combination thereof, as examples. Certain embodiments include 3D printing, additive manufacturing methods, or components made using 3D printing, additive manufacturing methods, or the like (e.g., backpack components, for instance, lumbar pads).

Figure 2:
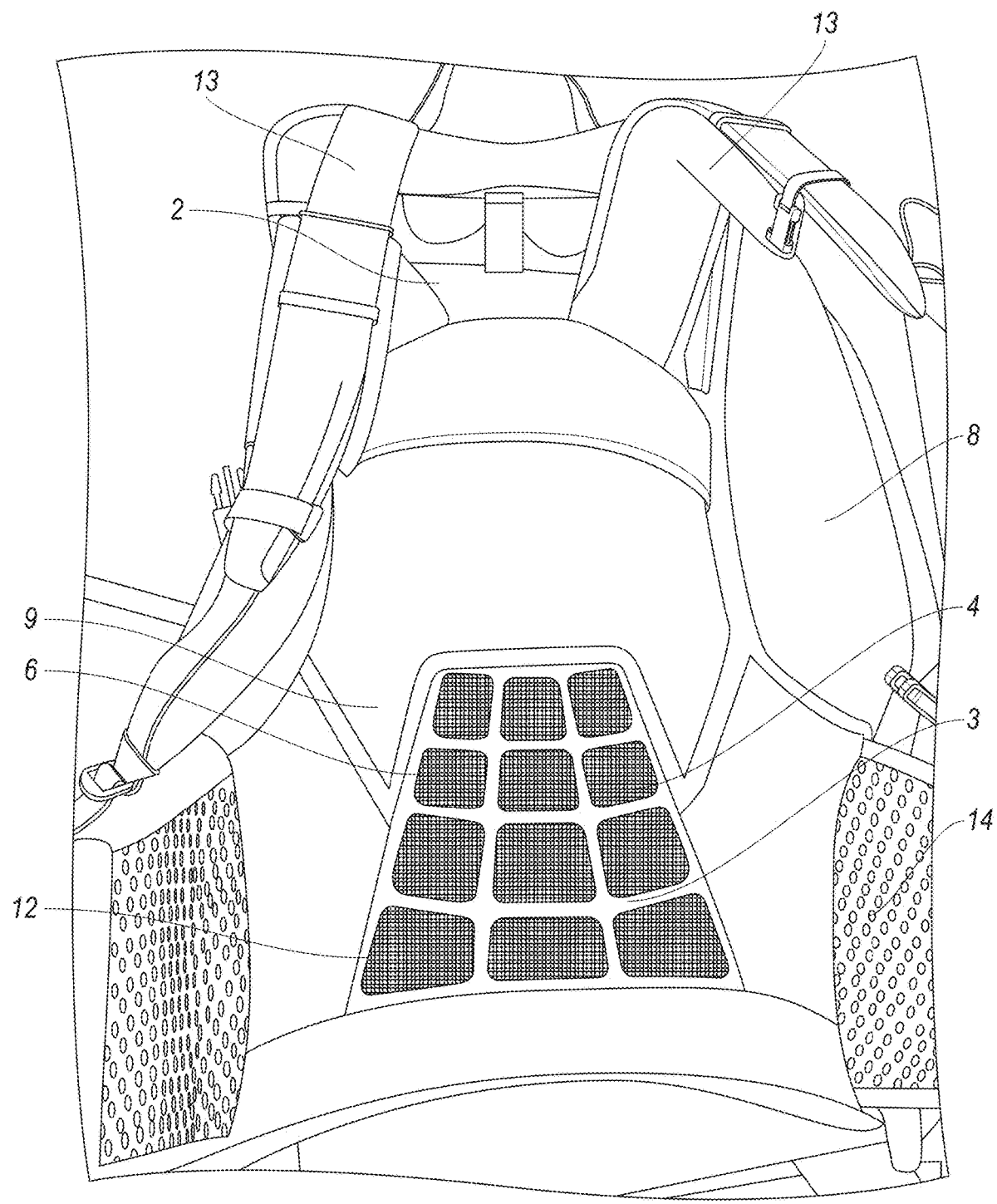
Figure 3:
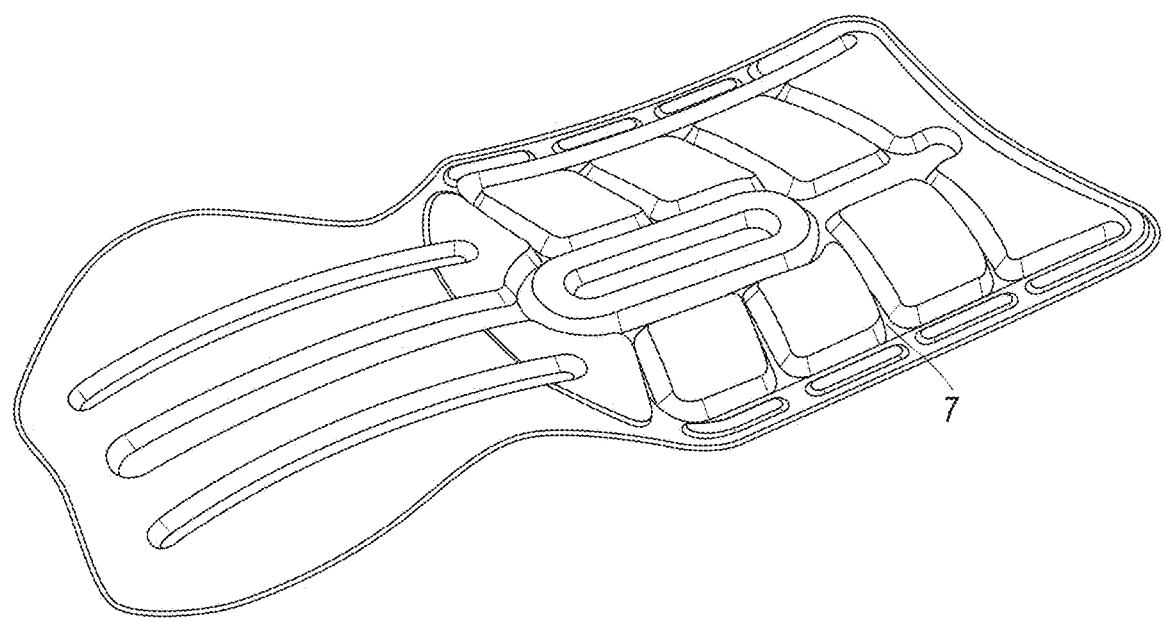
FIGS. 3 and 4 illustrate an example of a backpack framesheet that can be used with the backpack of FIG. 1, for instance.
Figure 4:
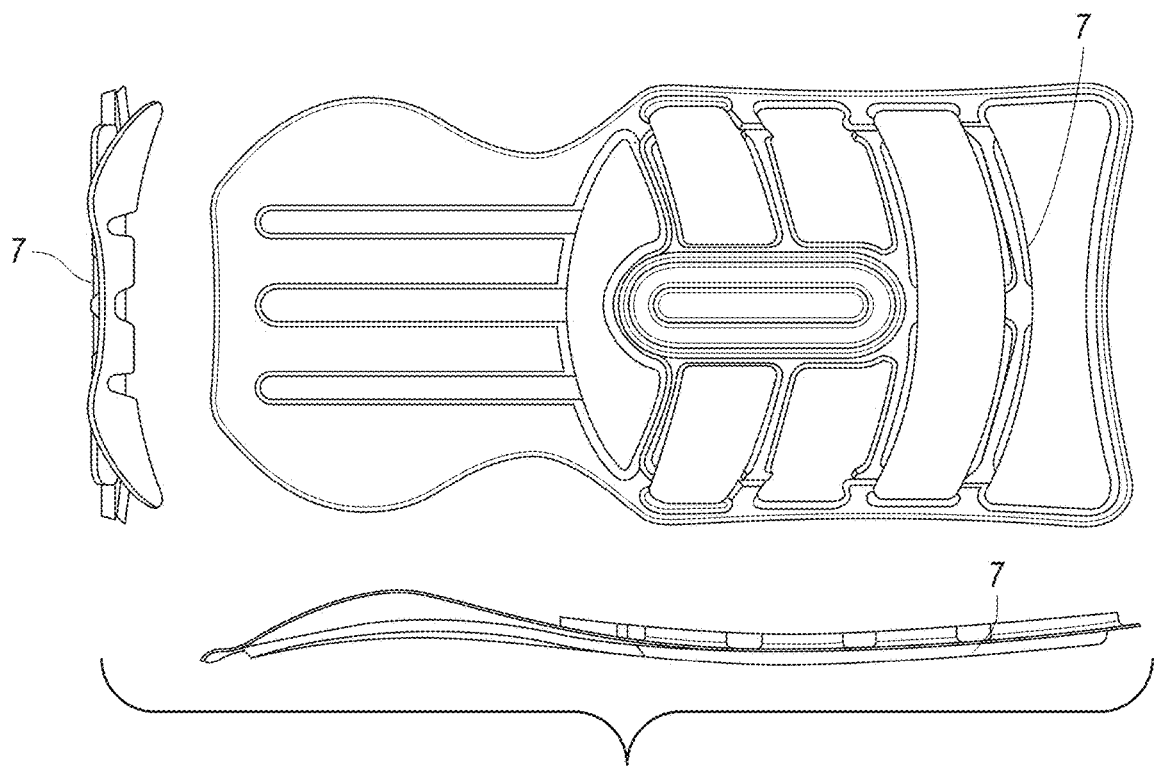

In some embodiments, a backpack includes a lumbar pad that sits at the base of a back panel of the pack. In a number of embodiments, the lumbar pad carries at least a portion of the load of the pack on the base of the user's back, for example, in conjunction with the hip belt and harness. Further, in particular embodiments, the lumbar pad has a lattice-style structure that allows airflow, provides cushioning, or both. Various shapes and designs of a lumber pad are contemplated. Two exemplary backpacks 1 and 2 are shown in FIGS. 1 and 2. Each have a pattern 3 of holes 4 in the surface and are shaped like an isosceles trapezoid. In the embodiment shown in FIG. 1, the corners and sides of the lumbar pad 5 are rounded. In the embodiment shown in FIG. 2, the lumbar pad 6 has straighter sides and angled corners. In various embodiments, the lumbar pad may sit on a stiff foam framesheet 7 (FIG. 1) or a suspended or trampoline back panel 8 (FIG. 2) but may be a separate plastic sheet, as examples. While described with reference to a framesheet 7 or a trampoline back panel 8, the lumbar pads of the present application may be coupled directly to a back panel of the backpack extending vertically between the harness and the hip belt. FIG. 1 shows an example of the lumbar pad 5 on a back panel 9 sitting in top of a stiff foam framesheet 7 of an example of a backpack 1. FIG. 2 shows an example of the back pack 2 with the lumbar pad 6 on a back panel 9 that is held onto a suspended or trampoline back panel 8 but has a separate plastic sheet. FIG. 1 shows an example of a three-dimensional back panel construction with the backpack 1 that creates a space between a mesh panel 11 proximal a user's back and a plastic sheet 7 distal the user's back, by use of foam pads to separate the body of the backpack from the user's back and thus create airflow. FIG. 2 shows an example of a three-dimensional back panel construction for the backpack 2 that creates a tensioned mesh panel 12 to separate the body of the backpack from the user's back and thus create airflow and weight/load distribution across the user's back. Also at least partially shown in FIGS. 1 and 2 are examples of harnesses 13 (i.e., shoulder harnesses), which are the straps that secure the user's shoulders to the backpack; and the hip belt, which includes the straps that secure the user's waist to the backpack. FIGS. 3 and 4 illustrate an example of the backpack framesheet 7, for example, that can be used with the backpack of FIG. 1.

Figure 5:
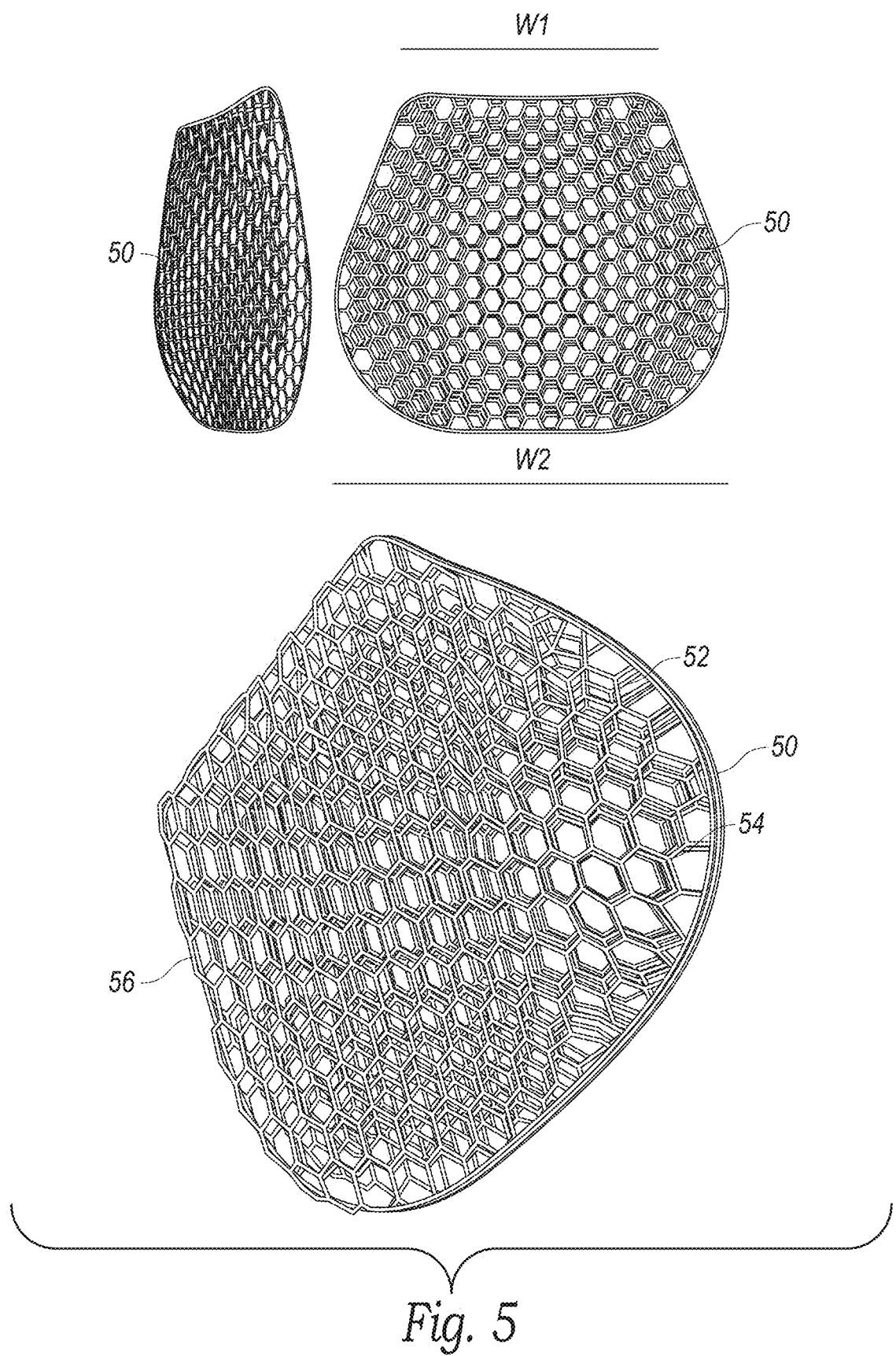
FIGS. 5 and 6 illustrate an example of a lumbar pad, for instance, for a backpack, and show an example of the internal structure of a lumbar pad.
Figure 6:
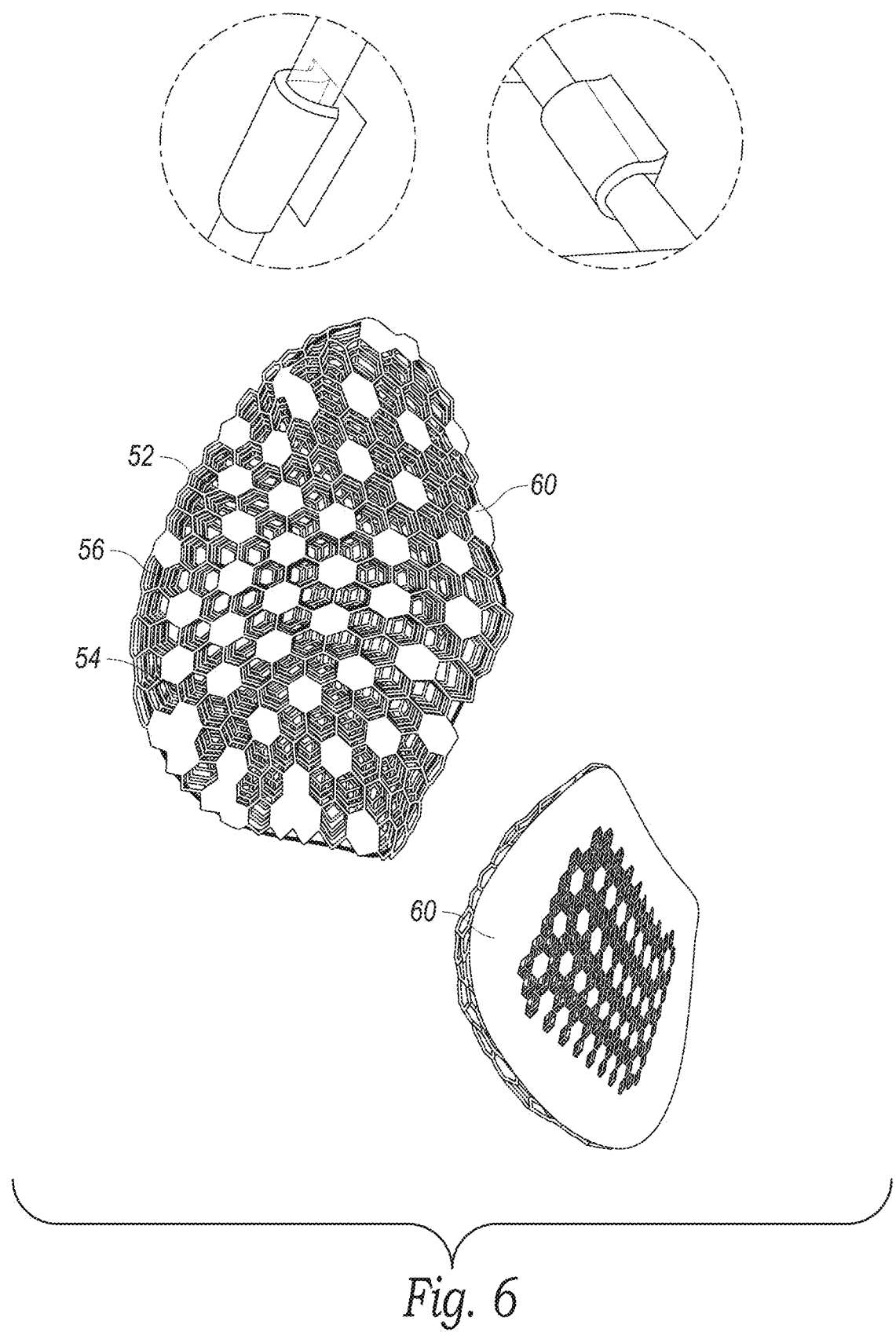
Figure 27:
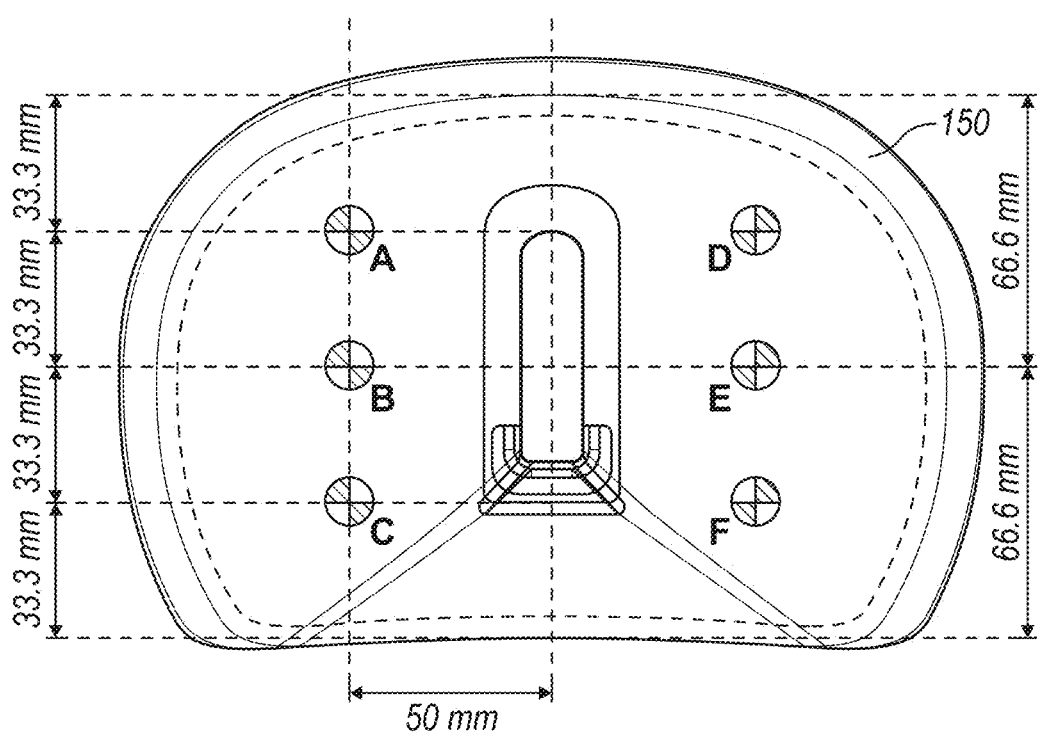
FIG. 27 illustrates an example of a lumbar pad consistent with the technology of the present application.
Figure 28:
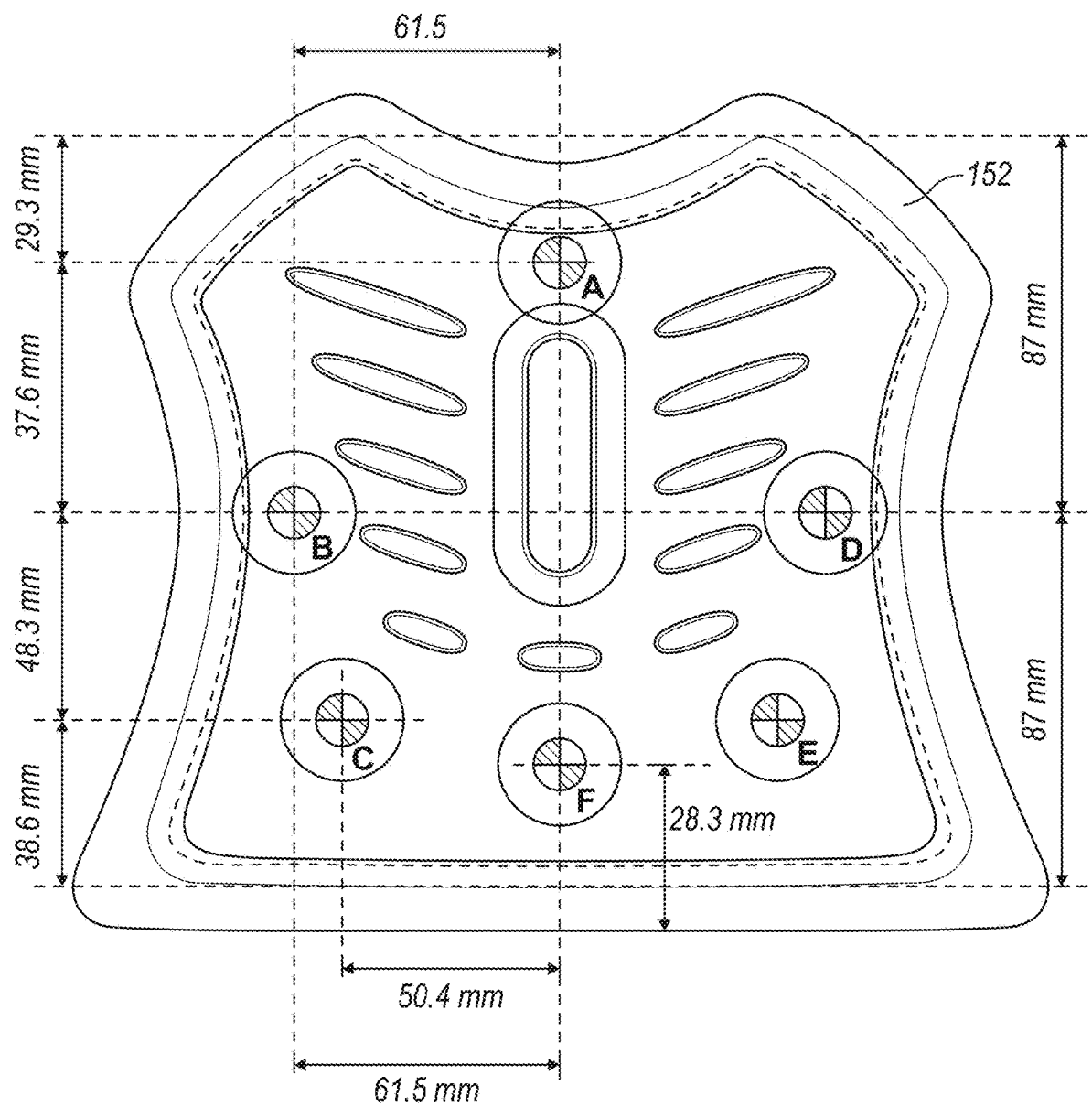
FIG. 28 illustrates an example of a lumbar pad consistent with the technology of the present application.

FIGS. 5 and 6 illustrate an example of a lumbar pads 50 and 60, which may be shaped to fit a lumbar region of a backpack, such as the backpacks 1 and 2 above. The lumbar pads 50 and 60 in FIGS. 5 and 6 may form the area or component of a backpack that is in contact with the user's back, such as the lumbar area. The lumbar pads 50 and 60 in FIGS. 5 and 6 may be made using 3D printing or additive manufacturing, for example. The lumbar pad in FIGS. 5 and 6 is an example of a three-dimensional pad that is used to pad the lumbar area of a wearer of a backpack. Various embodiments, including the embodiment illustrated, allow ventilation and provide variable resistance and cushioning and weight transfer to the lower back of the user. The lumbar pads 50 and in FIGS. 5 and 6 is an example of lumbar pads with a lattice structure 52 that includes a network of beams 52 and nodes 54 that create cells in a three dimensional form. The beams 52 and nodes 54 may be formed into layers 56. The material from which the lumbar pads 50, 60 are constructed, the density of the layers 56, and the construction of the beams 52 and nodes 54 all may be designed to provide a hardness or flexibility for the foam. The hardness may be, for example, measured by the amount of force required to compress the foam 40% of its original size, which in this case would be in the front to back direction. FIGS. 27 and 28 show lumbar pads 150 and 152 with hardness measurement points A-F, which will be referred to as 150$a$-$f$ and 152$a$-$f$ to distinguish between the two pads. The measurements, as shown, are taken symmetrically around the lumbar pads 150 and 152. The hardness values differ based on location on the pads as well as thickness. Generally, the hardness values increase from the top to the bottom, for lumbar pad 150. For the lumbar pad 152 the hardness values increase from the top to the bottom and from the outer regions to the center regions. In other words, the pressure gradient may be increasing top to bottom and decreasing inside out. The lumbar pad 150 may have exemplary hardness as shown by table A for a 3 mm thick pad and a 6 mm thick pad. The lumbar pad 152 may have hardness as shown by table B for a 3 mm thick pad and 6 mm thick pad respectively.

TABLE A

AIRSCAPE
Tolerance = ±5%

| Position | 3 mm | 6 mm |
| --- | --- | --- |
| A & D | 20.0N | 31.1N |
| B & E | 27.8N | 40.5N |
| C & F | 31.6N | 47.0N |

TABLE B

AIRSPEED
Tolerance = ±5%

| Position | 3 mm | 6 mm |
| --- | --- | --- |
| A | 17.4N | 30.7N |
| B & D | 16.9N | 39.6N |
| C & E | 29.9N | 47.4N |
| F | 23.3N | 50.9N |

As indicated, the force, or newtons, necessary to compress the lumbar pads 150 and 152 40% are shown. The measurements are, in this case, obtained using a 28.5 mm circular pressure instruments. Also, the tolerance of the readings is 5%. Thus, to the extent a specific newton measurement is referenced as, for example, about 20.0N or approximately 20.0N (see point 150$_{a,\ d}$ at 3 mms) means within a plus or minus 5% of 20.0Ns, or in this case 19 to 21 newton. The lumbar pads 50 and 60 may also be defined by specific hardness by measuring the indention deflection, a durometer of the foam, or other hardness indications. Further, the lumbar pads 50 and 60 shown in FIGS. 5 and 6 are examples of lumbar pads that are anatomically shaped to match and fit the shape of the user's body. \Still further, in various embodiments, the lumbar pads 50 and 60 (e.g., including the pad shown in FIGS. 5 and 6) can be positioned on top of a plastic sheet 7 (e.g., the backpack of FIG. 1) or on a mesh panel 8 (e.g., the backpack of FIG. 2), for instance, between the user's back and the lower portion of the backpack's back panel. As can now be appreciated on reading the disclosure, the lumbar pads 50 and 60 may have similar hardness distributions to the lumbar pads 150 and 152.

Figure 29A:
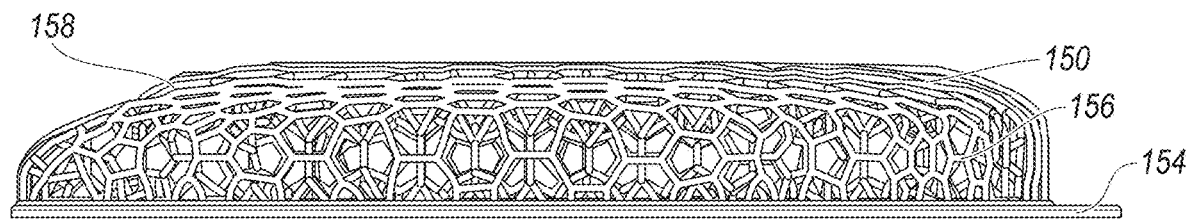
Figure 29B:
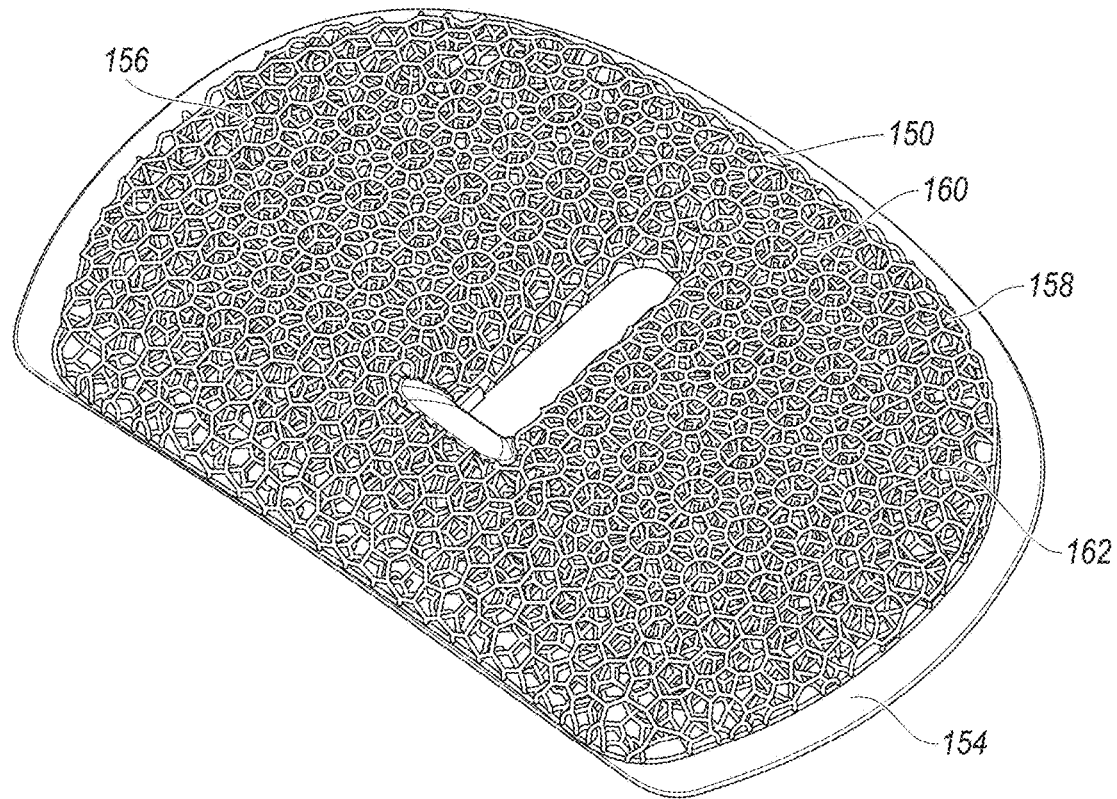
Figure 29D:
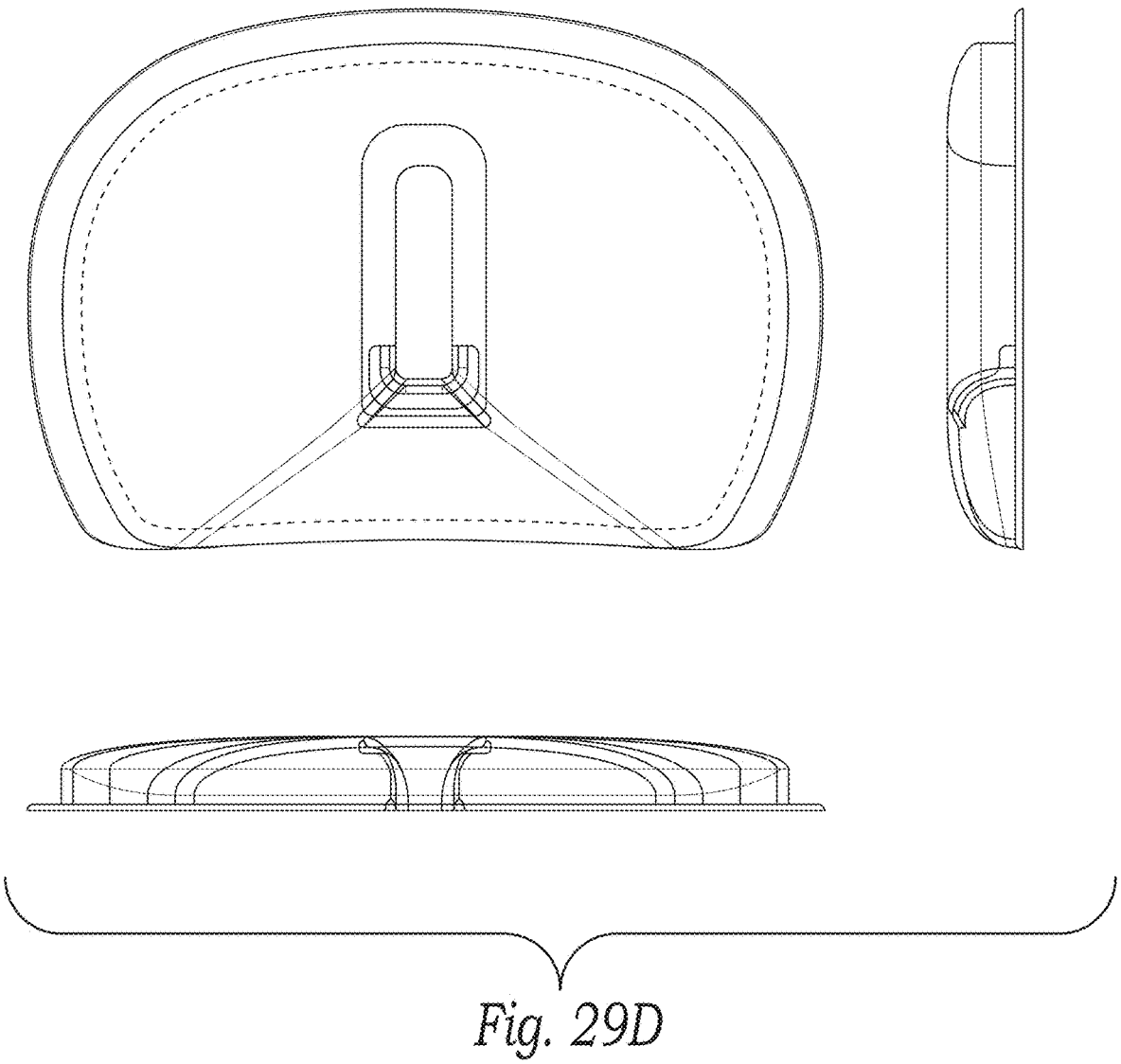
Figure 31:
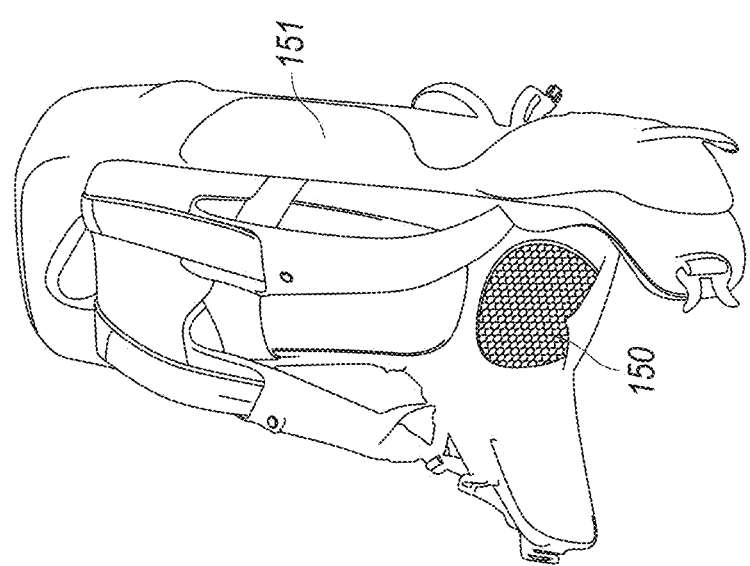
FIG. 31 is a view of a backpack with the lumbar pad of FIGS. 29A-D.

FIGS. 29A-D shows the internal structure of the lumbar pad 150 through a side view (29A), a perspective top view (29B), and a bottom view (29C). The lumbar pad 150 has a ribbon base surface 154 extending around a perimeter edge of the lumbar pad 150, which also defines the outer dimensions of the lumbar pad 150, see FIG. 29D. The ribbon base surface 154 has a width sufficient to allow attachment to framesheet or trampoline back panel as described above. The attachment may be via a stitch, weld (sonic, fusion, etc), adhesive, or the like. The lumbar pad 150 has an internal structure 156 formed by a series of interconnected beams 158, which forms the lattice structure. The beams 158 form circular (or curved) portions 160 and straight portions 162. Generally, the circular portions 160 form nodes and the straight portions 162 form interconnecting branches. The beams 158, in certain aspects, are formed by additive manufacturing and are bonded directly to the ribbon base surface 154. The ribbon base surface 154 is shown best in FIGS. 29C. FIG. 29D shows an exemplary dimensional lumbar pad 150 for a backpack consistent with the technology of the present application. A backpack 151 having lumbar pad 150 is shown in FIG. 31.

Figure 30A:
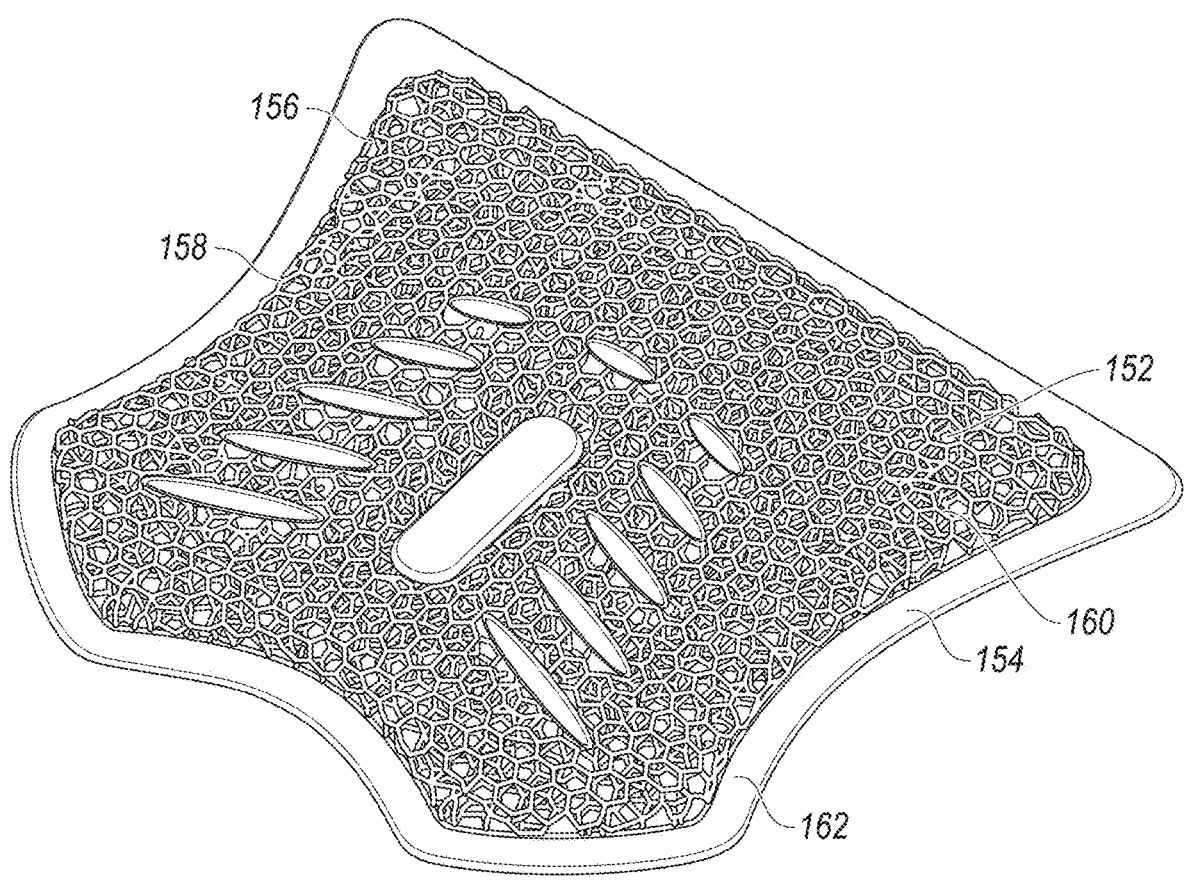
FIGS. 30A-C are views of a lumbar pad consistent with the technology of the present application.
Figure 30B:
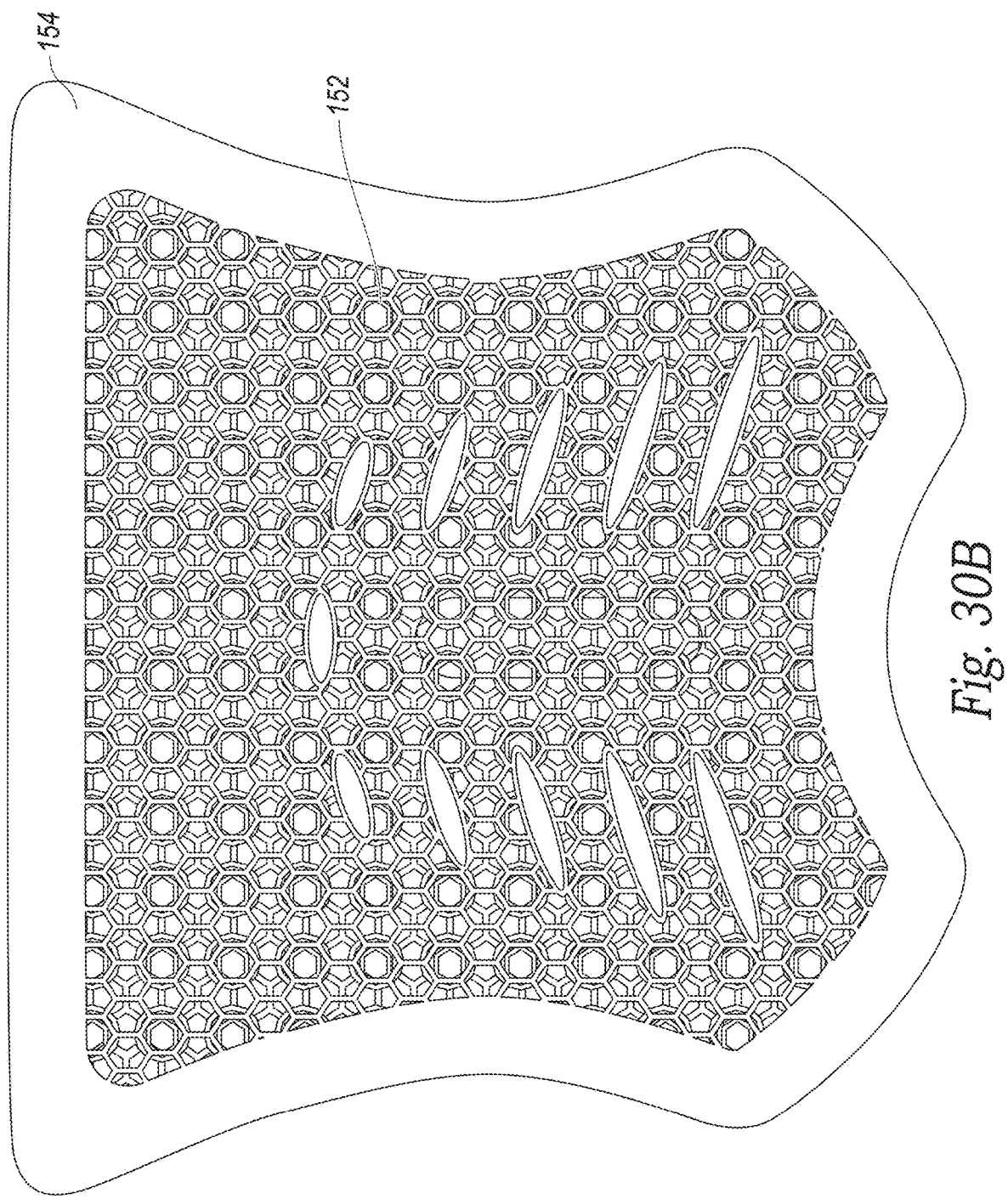
Figure 30C:
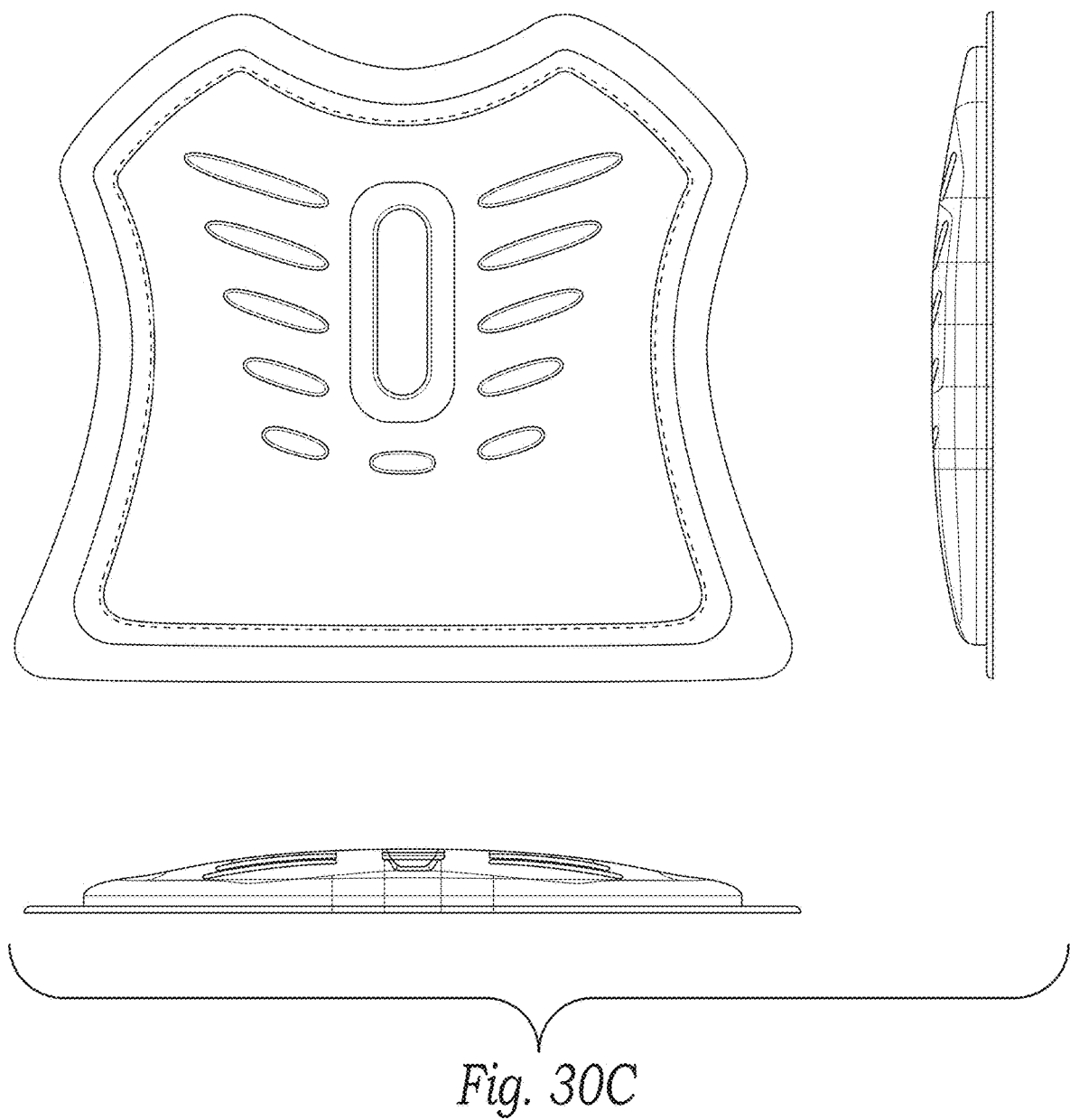
Figure 32:
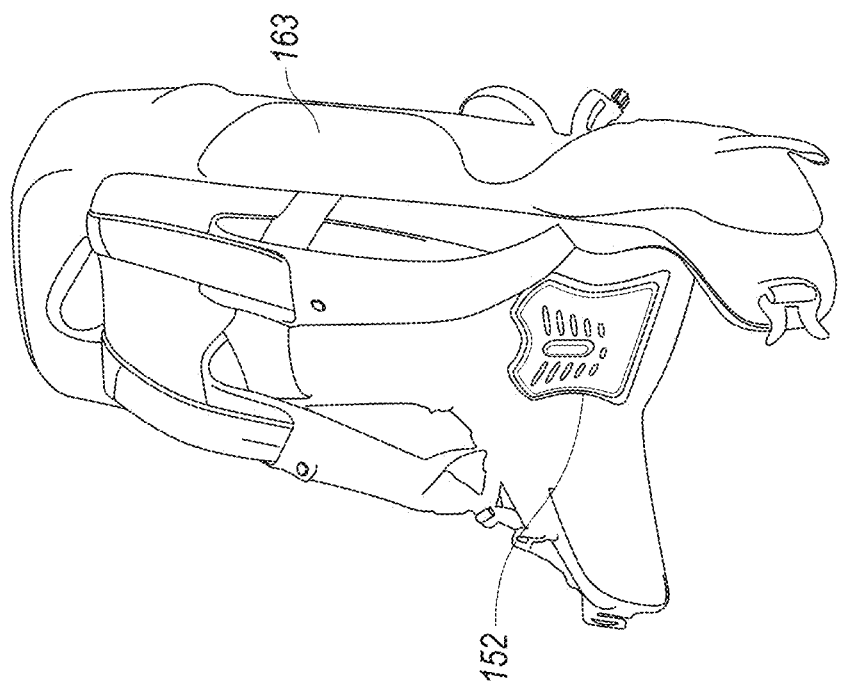
FIG. 32 is a view of a backpack with the lumbar pad of FIGS. 30A-C.

FIGS. 30A-C show the internal structure of the lumbar pad 152 through a perspective top view (30A) and a bottom view (30B). The lumbar pad 152 has a ribbon base surface 170 extending around a perimeter edge of the lumbar pad 152, which also defines the outer dimensions of the lumbar pad 150, see FIG. 30C. Similar to the above lumbar pad 150, the ribbon base surface 154 has a width sufficient to allow attachment to the framesheet or trampoline back panel of the backpack, which attachment may be by any of the identified means above. The lumbar pad 152 has an internal structure 156 formed by a series of interconnected beams 158, which form the lattice structure. The beams 158 form circular (or curved) portions 160 and straight portions 162. The beams 158 in certain aspects, are formed by additive manufacturing and are bonded directly to the ribbon base surface 170, which is best shown in FIG. 30A. FIG. 30C shows an exemplary dimensional lumbar pad 152 for a backpack consistent with the technology of the present application. A backpack 163 having lumbar pad 152 is shown in FIG. 31.

In various embodiments, the lumbar pad is attached to a rigid plate, such as the framesheet 7 described above, open mesh, such as the trampoline back panel 8 described above, a foam base, or the like, or combinations thereof, as examples. The lumbar pads 50 and 60 may be attached using adhesive, stitching, fusion welds, sonic welds, lugs, buttons, or straps and elements wrapping over the component, as examples, to hold the lumbar pad in position (e.g., on the backpack). Still further, various embodiments are breathable, allow air to move within the lattice structure, or both. Even further, various embodiments are non-porous, quick drying, UV resistant, or a combination thereof. Some embodiments, for example, are made from a flexible polymer. Further still, various embodiments are abrasion resistant. Moreover, in a number of embodiments, the surface texture is lightly textured yet perforated (e.g., to provide grip and air and moisture movement). Even further still, various embodiments are sweat and salt resistant, hydrophobic or hydrophilic, flexible at a range of temperatures (e.g., minus 40 to 100° C.), flexible and supportive under loads (e.g., 0-40 Kg), or a combination thereof. Still further, various embodiments are REACH, PROP 65, and Bluesign Compliant.

Various embodiments include a harness 13, a hip belt 14, or both (e.g., shown in FIGS. 1 and 2). The backpack has a backpanel that extends vertically between the harness 13 and the hip belt 14. In certain embodiments, the body contact area of the harness 13 can have any combination of the features described herein for a lumbar pad. For example, in some embodiments, the body contact area of a harness is 3D printed, for example, to add ventilation, variable resistance, cushioning and weight transfer, or a combination thereof, for instance, to the shoulders of the wearer. Further, in particular embodiments, the hip belt 14 can have any combination of the features described herein for a lumbar pad. For example, in some embodiments, the body contact area of a hip belt may be 3D printed, for example, to add ventilation, variable resistance, cushioning, weight transfer to the pelvis, or a combination thereof, as examples. Even further, in certain embodiments, the back panel or body contact area to the lower side of the harness can be 3D printed, for example, to add ventilation, variable resistance and cushioning and weight transfer to the back, for example.

Certain embodiments are customizable to the consumer (e.g., mass customization), for example, by having consumers provide (e.g., into a website) certain of their body dimensions and then fabricating one or more components (e.g., of the backpack for instance, the lumbar pad, harness, hip belt, etc.) based on those body dimensions, for example, using 3D printing. Various embodiments are customizable to the consumer's shape, desired load capacity (e.g., entered by the consumer into the website), or both.

Figure 7:
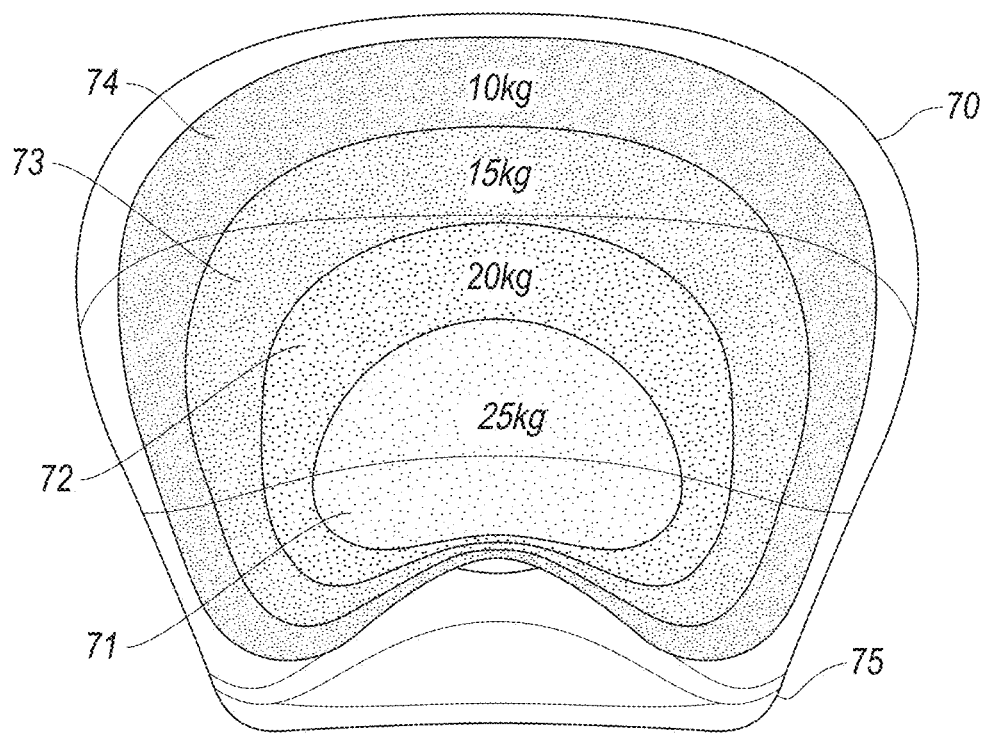
FIGS. 7 and 8 illustrate examples of pressure maps of lumbar pads.
Figure 8:
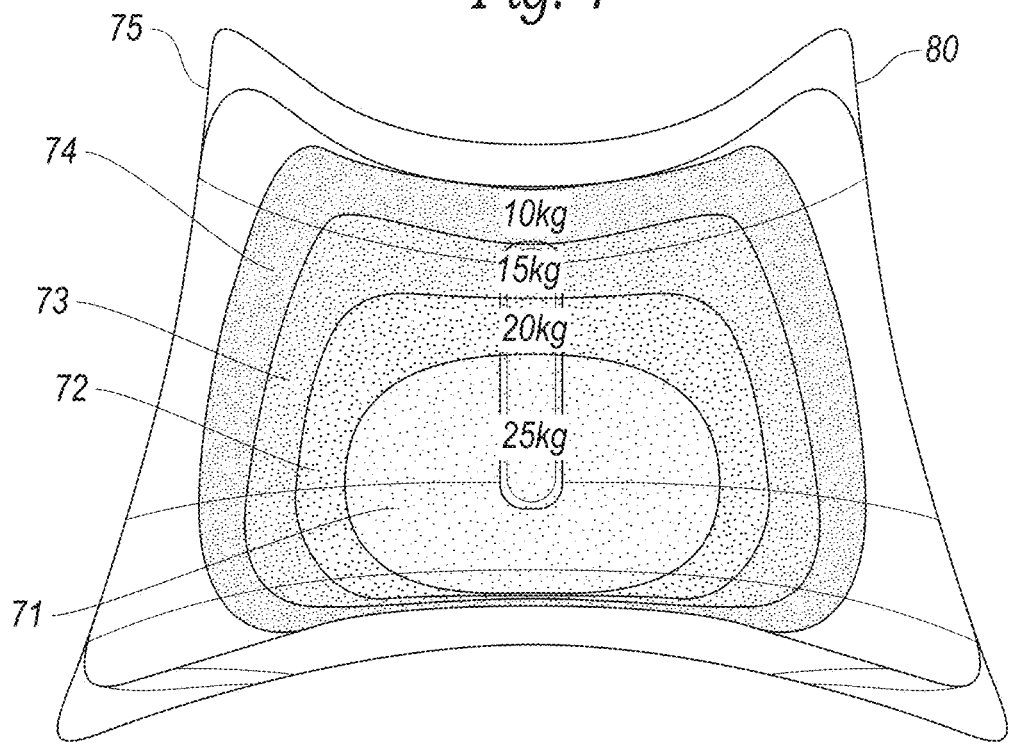
Figure 9:
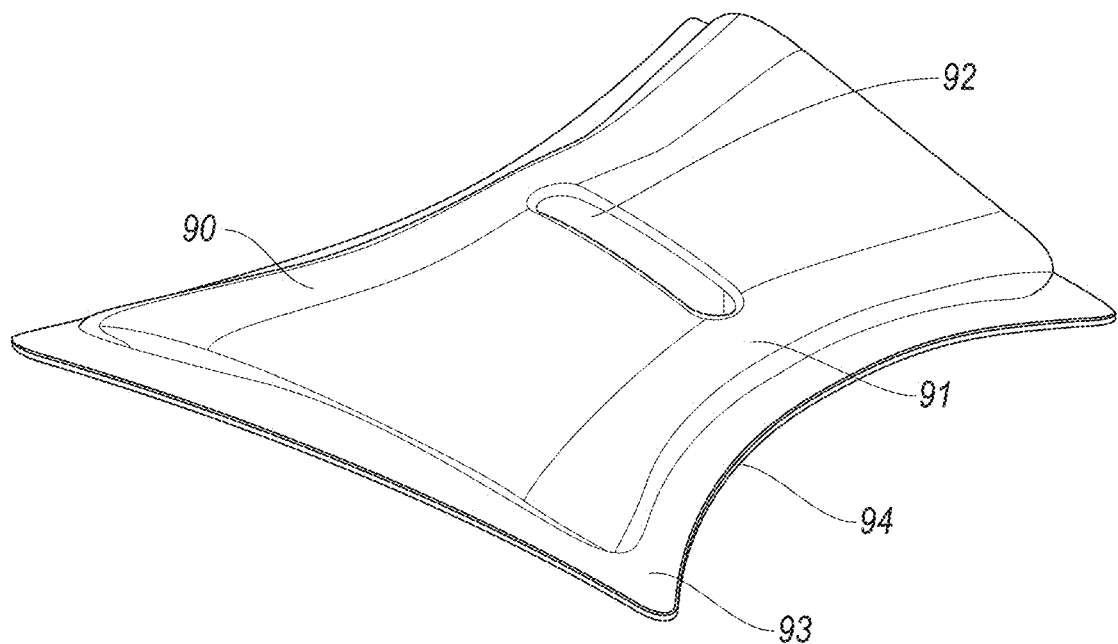
FIGS. 9-14 are different views that illustrate another example of a lumbar pad and show the external shape.
Figure 10:
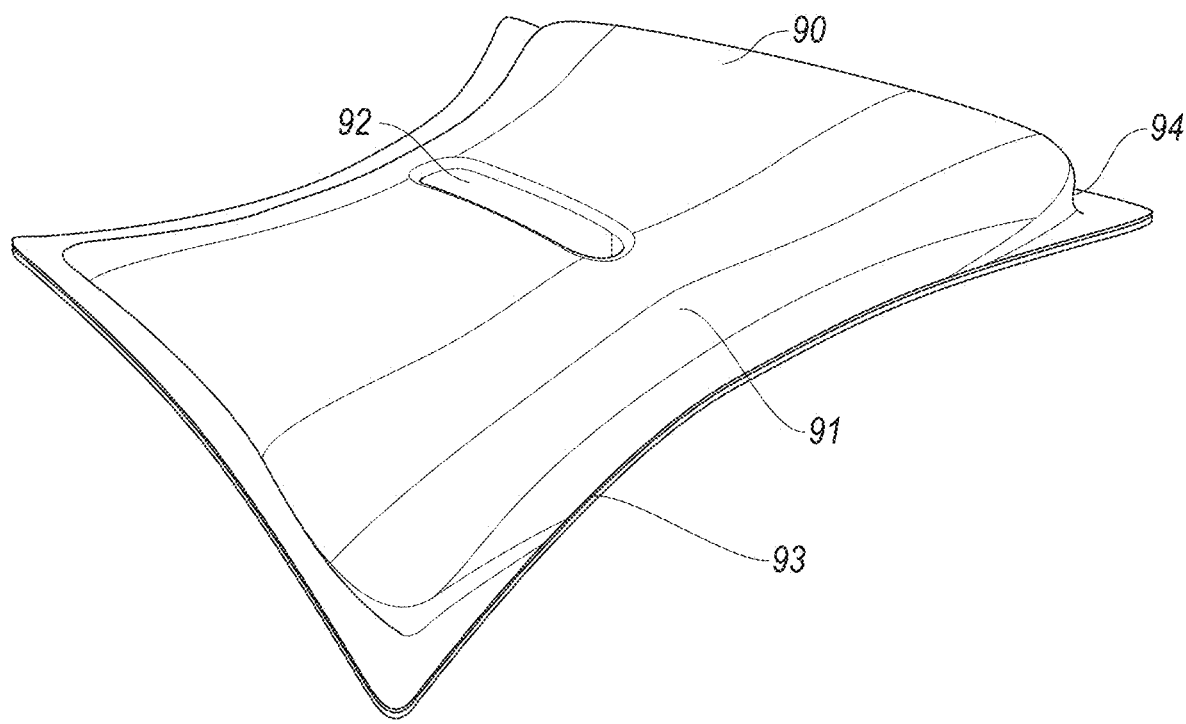
Figure 11:
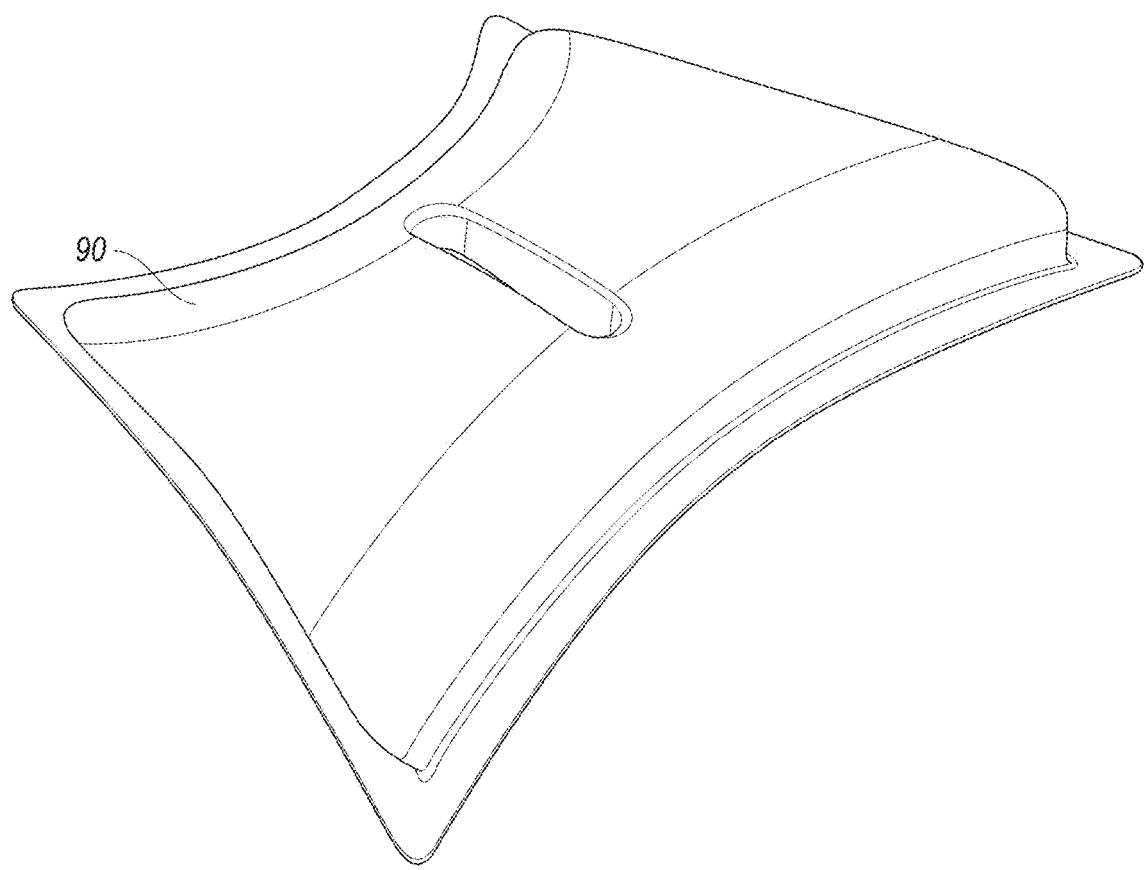

In particular embodiments, specific performance characteristics are provided. For example, some embodiments provide variable stiffness or flexibility, for instance, across the surface of the component, for example, to allow the load transfer to be supported with areas of higher resistance and for more comfort (more flex and cushioning) to be afforded in areas under lower loads. FIG. 7 illustrates an example of a pressure map of a lumbar pad 70 showing an example of how the resistance may be distributed on a lumbar pad. This illustrates the relative stiffness of the lumbar pad, for example, to provide comfortable force distribution to the user's body (e.g., back or lumbar region). As shown, the lumbar pad 70 has a center region 71 with a relatively high resistance or firmness, which corresponds to tables A and B above. The center region 71 is surrounded by a first boundary area 72, which is surrounded by a second boundary area 73, which is surrounded by a third boundary area 74, etc. As can be appreciated, any number of boundary areas are possible, from 1 to n. Generally, the force decreases from the center region 71 to the outermost boundary area, which is the third boundary area 74 in this example. FIG. 8 illustrates another example of a pressure map of a lumbar pad 80 showing another example of how the resistance may be distributed on a lumbar pad. As can be appreciated, lumbar pad 80 also has the center region 71, which the first, second, and third boundary areas 72, 73, 74. As can now be appreciated, the center region and boundary areas are generally shaped consistently with the outer periphery 75 of the lumbar pad 70, 80. This illustrates another example of the relative stiffness of a lumbar pad, for example, to provide comfortable force distribution to the user's body (e.g., back or lumbar region).

FIGS. 9-14 illustrate another example of a lumbar pad. These Figures illustrate the external shape or envelopes of a lumbar pad. The internal structure may be similar to that shown in FIGS. 5 and 6, for example. The pressure maps of FIGS. 7 and 8 may apply to the shape of the lumbar pad shown in FIGS. 9-14. FIGS. 9-14 show a lumbar pad 90. The lumbar pad 90 is shaped somewhat like a trapezoid pinched about the midline 91. The lumbar pad 90 has an elongated hole 92, arranged vertically when on the backpack, at the midline 91 of the lumbar pad 90. The lumbar pad 90 also comprises a flanged surface 93 about the perimeter 94 of the lumbar pad 90. The elongated hole 92 is oriented vertically when the backpack is being worn by a user who is standing upright. As shown in some of the figures herein, additional ventilation may be provided by additional elongate holes.

Figure 12:
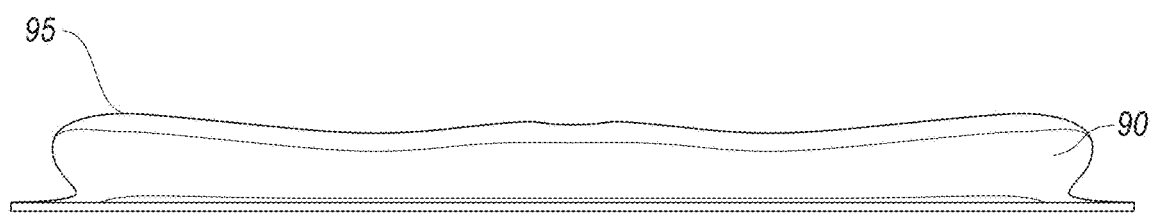
Figure 13:
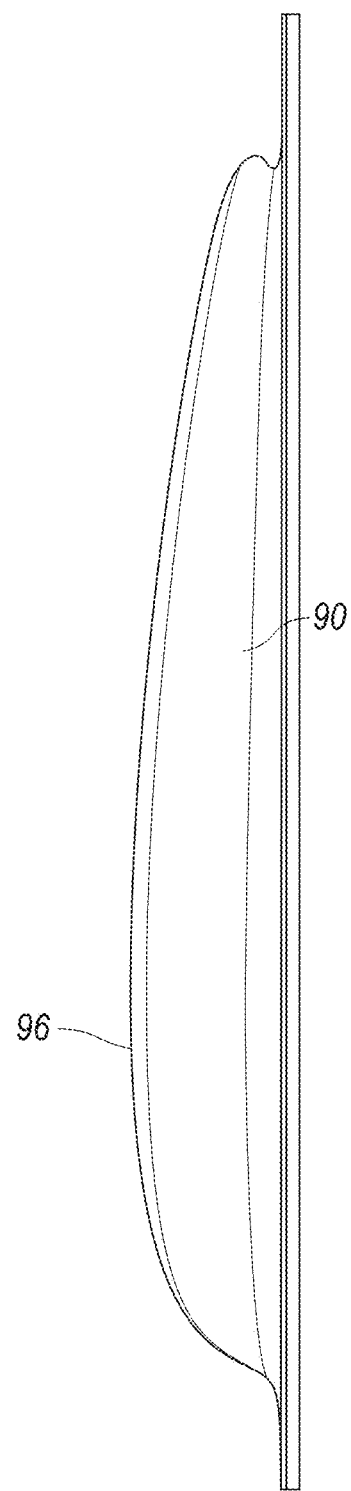
Figure 14:
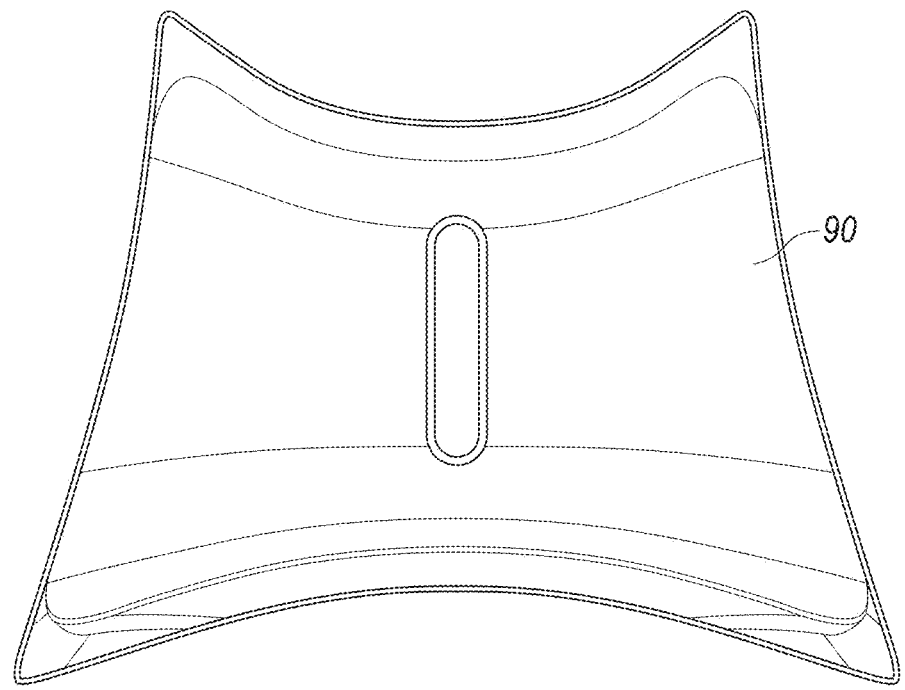
Figure 15:
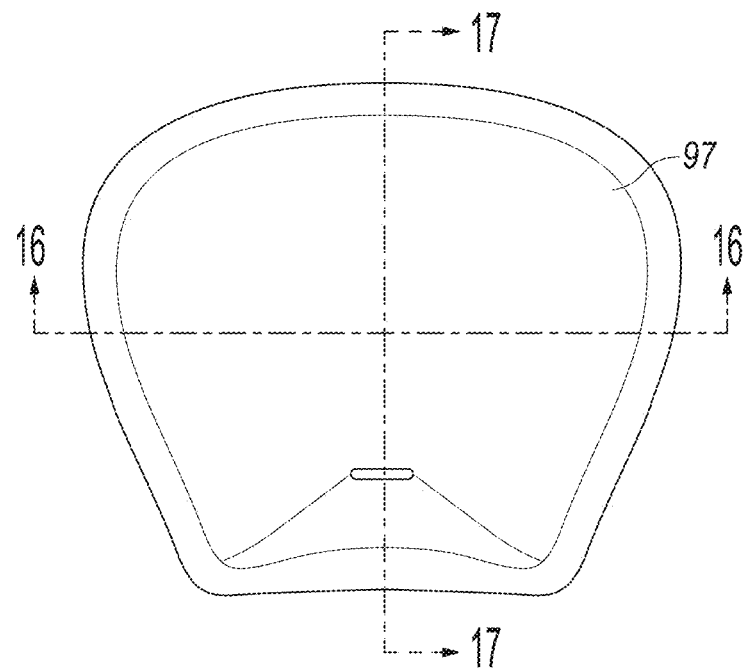
FIGS. 15-19 illustrate an example of a lumbar pad that may be similar to the lumbar pad(s) illustrated in FIGS. 5-7.
Figure 16:
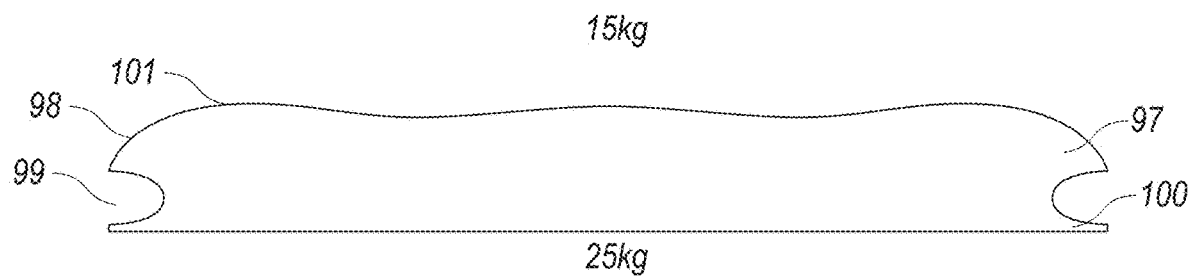
Figure 17:
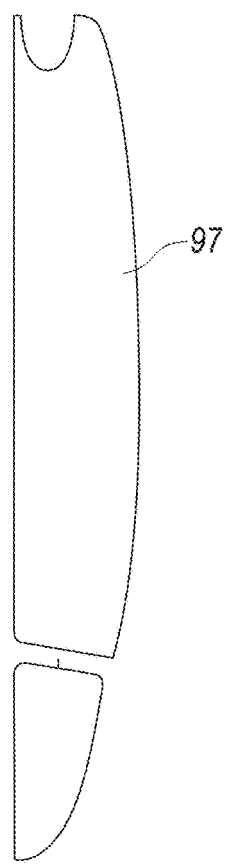
Figure 18:
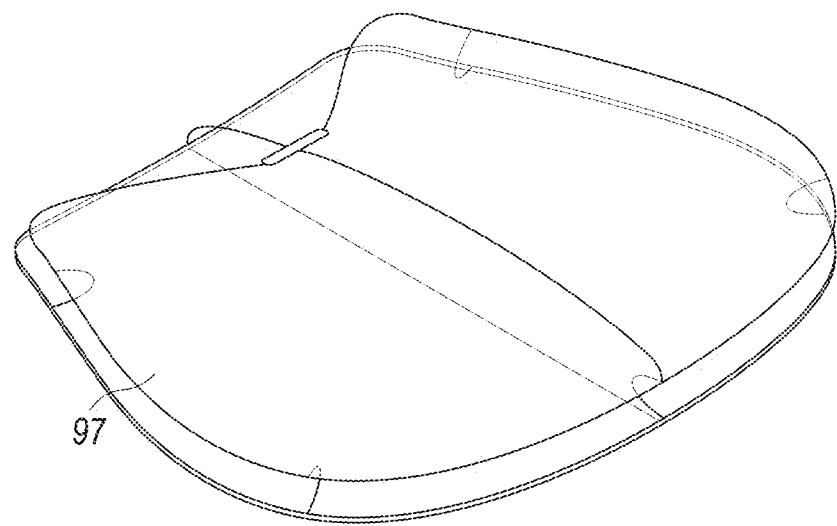
Figure 19:
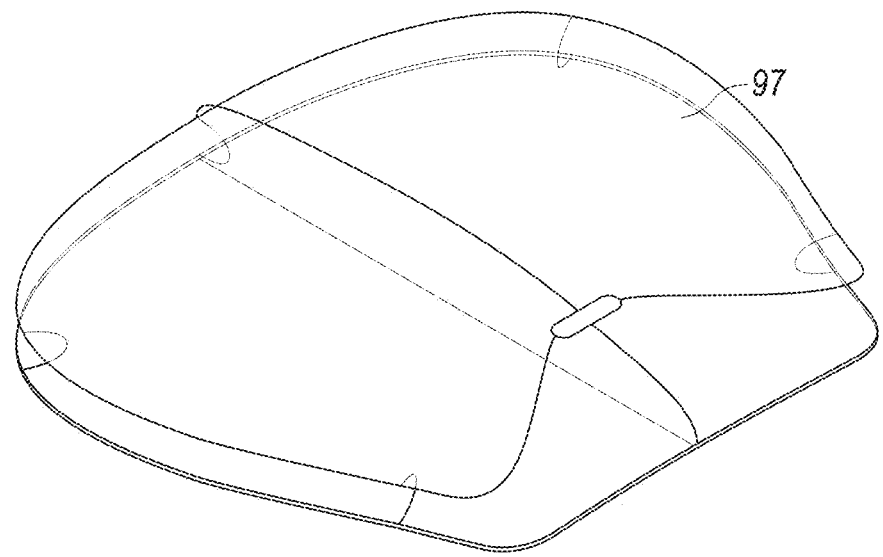
Figure 20:
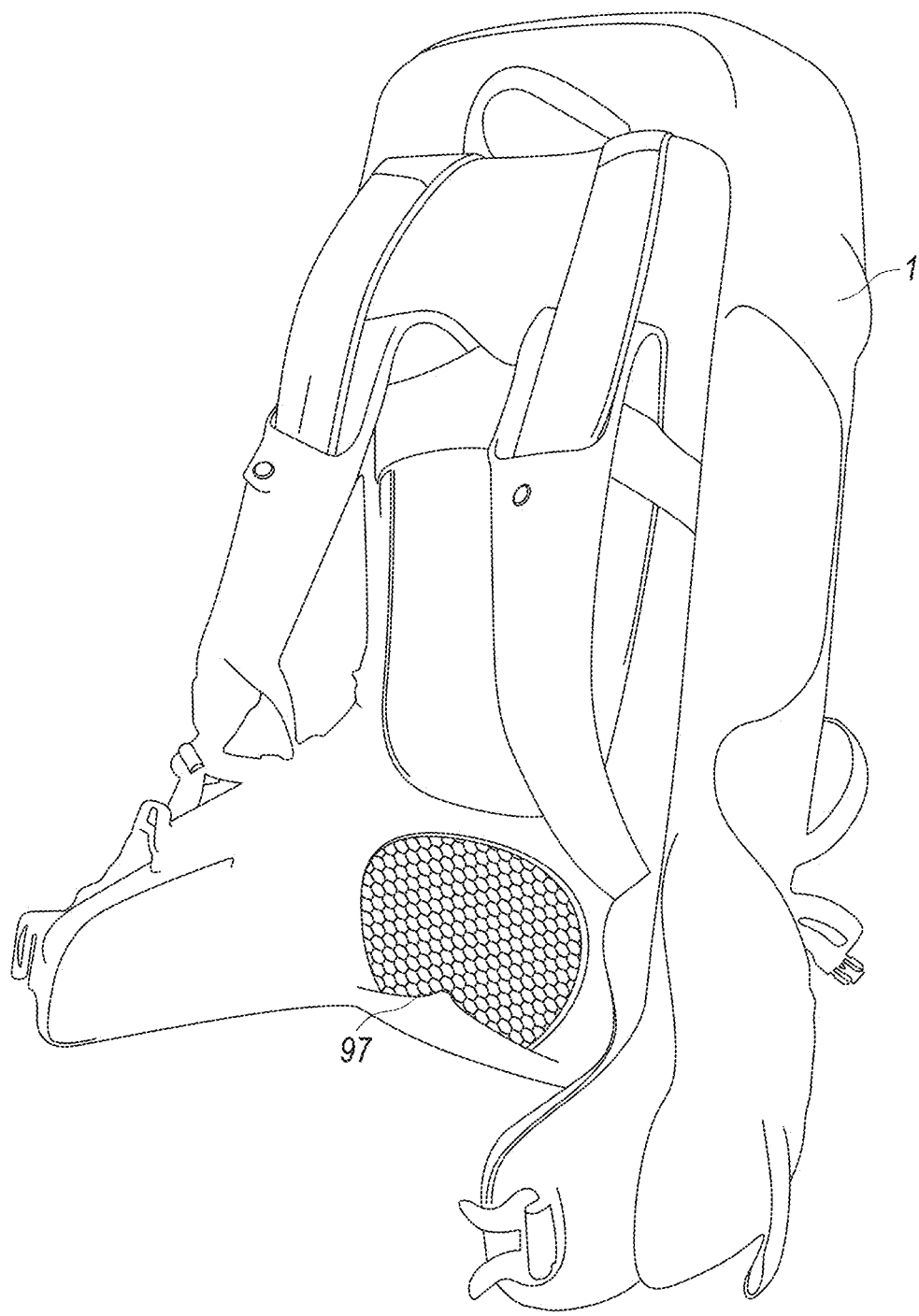
FIG. 20 is an isometric view of a backpack with the lumbar pad of FIGS. 15-19, and may be similar to the backpack of FIG. 1.
Figure 21:
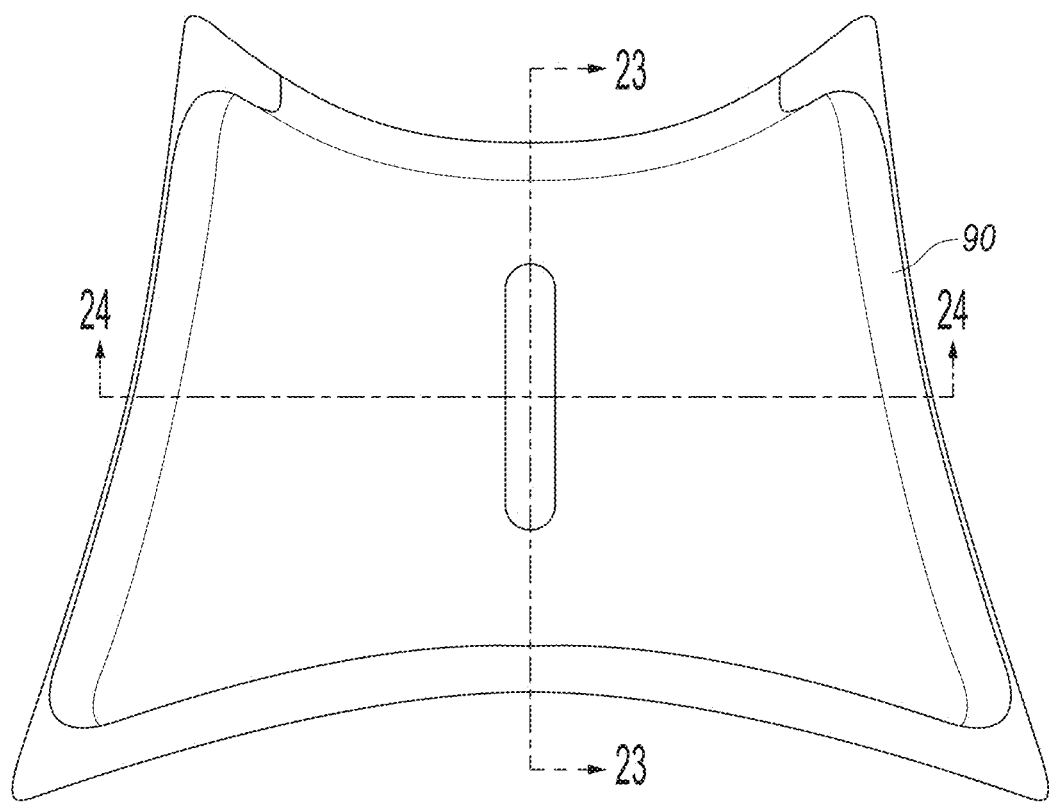
FIGS. 21-25 illustrate an example of a lumbar pad that may be similar to the lumbar pad(s) shown in FIGS. 8-14.
Figure 22:
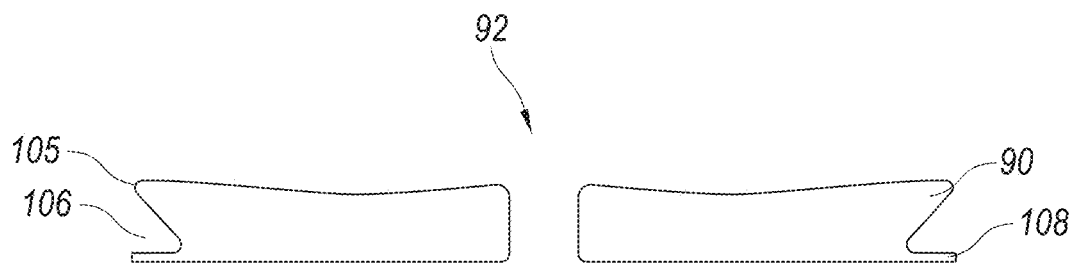
Figure 23:
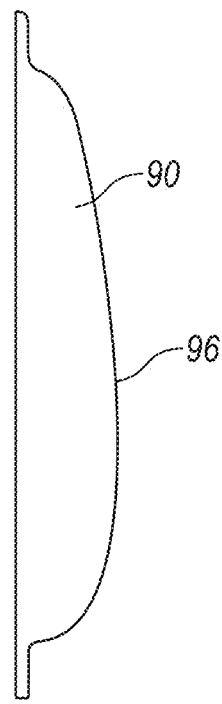
Figure 24:
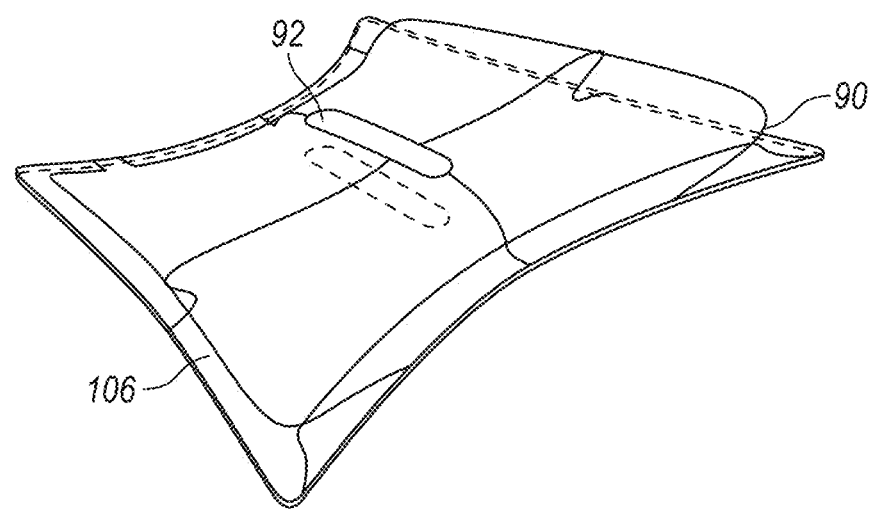
Figure 25:
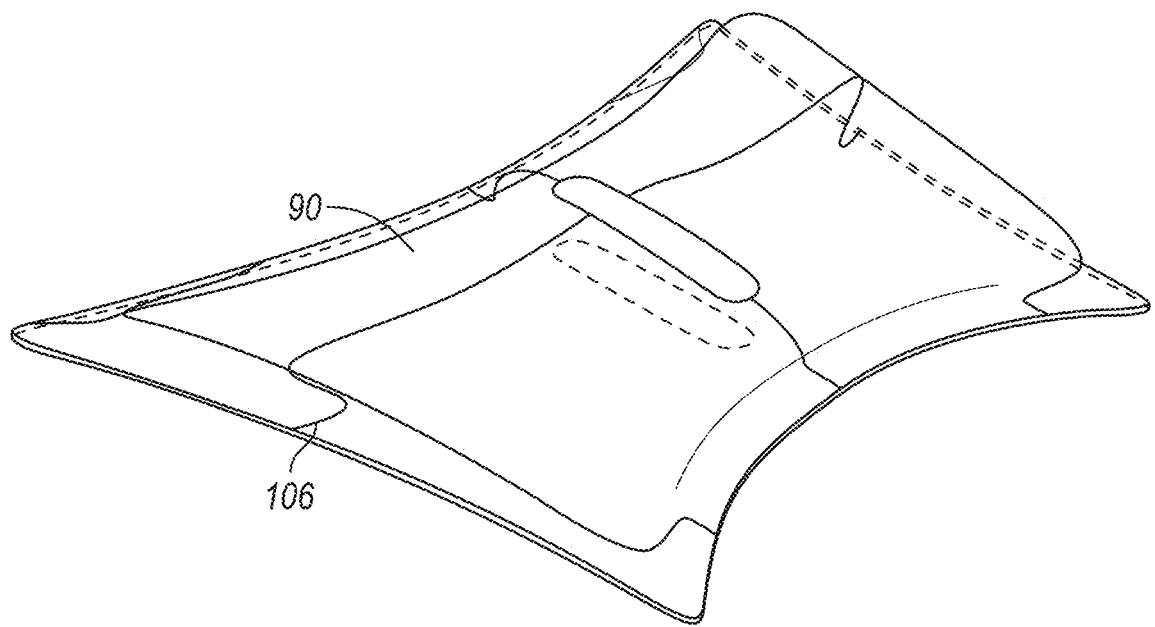
Figure 26:
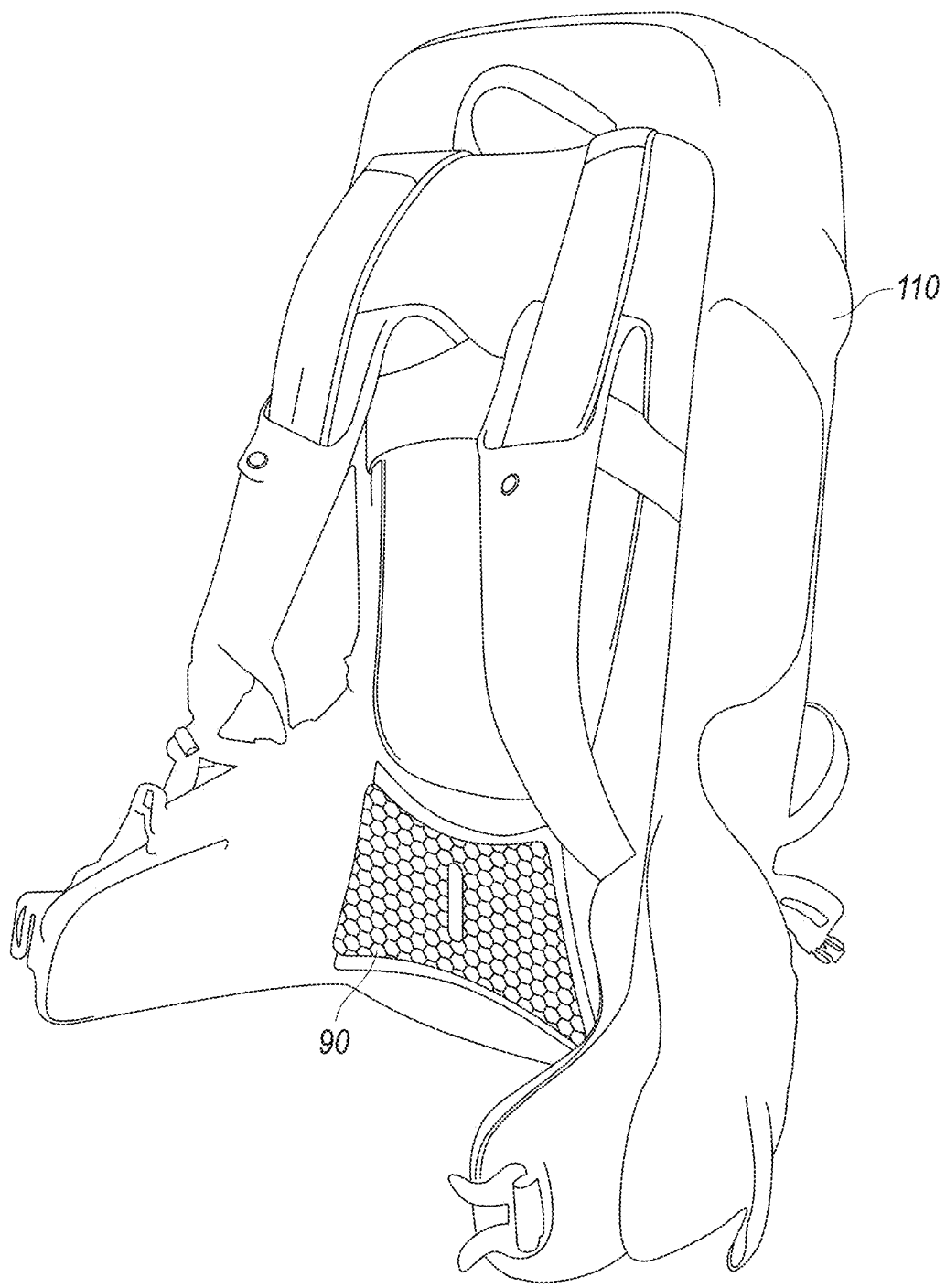
FIG. 26 is an isometric view of a backpack with the lumbar pad of FIGS. 21-25, and may be similar to the backpack of FIG. 2.

Thus, in some embodiments, there are a plurality of elongated holes 92 in the lumbar pad. The elongated holes 92 may have the same or different dimensions and shapes. FIG. 12 shows a bottom view of the lumbar pad 90 and FIG. 13 shows a side view of the lumbar pad 90. As shown in FIG. 12, the lumbar pad 90 has a undulating curvature 95 proximal the user's back. As shown in FIG. 13, the lumbar pad 90 has a convex shape 96 towards the user's back. FIG. 14 is a view of the lumbar pad 90 from the backpack side. FIGS. 15-19 illustrate an example of a lumbar pad 97 that may be similar to the lumbar pad(s) illustrated in FIGS. 5-7. FIG. 15 shows a view from the user's back of lumbar pad 97. FIG. 16 shows a top view of the lumbar pad 97. The lumbar pad 97 has an overhang 98 forming a channel 99 between a base 100 and outer surface 101. FIG. 17 shows a side view of lumbar pad 97. FIGS. 18 and 19 show perspective view line drawings of the lumbar pad 97. Further, FIG. 20 shows a backpack 1 with the lumbar pad 97 of FIGS. 15-19. The backpack of FIG. 20 may be similar to the backpack of FIG. 1 described above, for instance. Further still, FIGS. 21-25 illustrate an example of the lumbar pad 90 that may be similar to the lumbar pad(s) shown in FIGS. 9-14. FIG. 21 shows a plan view of the lumbar pad 90. FIG. 22 shows a cross sectional view through the elongate hole 92. Lumbar pad 90, as shown in FIG. 2, is provided with an overhang 105 forming a perimeter channel 106 between the overhang 105 and base 107. The perimeter channel 106 allows for some edge flexibility, which may provide comfort against the user's back. FIG. 26 shows a backpack 110 with the lumbar pad 90 of FIGS. 21-25. The backpack shown in FIG. 26 may be similar to the backpack 2 of FIG. 2, for example. The backpack 110 shows the harness straps 112 and hip belt 113 in more detail. Each of the harness straps 112 and hip belt 113 may include pads formed using 3d printing or other additive manufacturing methods.

Various embodiments include backpacks, as described above, for carrying items on the back of a user. Examples of backpacks are shown the Figures. In a number of embodiments, for example, the backpack includes at least one component that has been manufactured using 3D printing, such as, for example, the lumbar pads as described herein. In different embodiments, the component may be or include a lumbar pad as well as at least part of a shoulder harness, at least part of a hip belt, at least part of a back panel, or a combination thereof, as examples. Examples of shoulder harnesses and hip belts, or at least part thereof, are shown in the figures also. 3D printed parts thereof, however, may have certain aspects in common with the lumbar pad as shown and described herein. Further, various embodiments include (e.g., whether made using 3D printing or not) a lumbar pad, a shoulder harness, a hip belt, a back panel, or a combination thereof. Further still, some embodiments include a (e.g., three-dimensional) back panel, a body (e.g., for containing the items), a mesh panel, a plastic sheet, multiple foam pads, or a combination thereof. For example, in certain embodiments the three-dimensional back panel creates a space between the mesh panel and the plastic sheet, for instance, using the multiple foam pads to separate the body of the backpack from the user's back.

Some embodiments are specifically, or include, a lumbar pad, for example, for supporting a load on the lumbar region of a user. In certain embodiments, for example, the lumbar pad has been manufactured using 3D printing. An example is the lumbar pad shown in FIGS. 5 and 6. Further, in various embodiments, the component or lumbar pad is shaped like an isosceles trapezoid (e.g., FIG. 2) or like a rounded isosceles trapezoid (e.g., shown in FIGS. 1 and 5-26). Still further, in some embodiments, the component or lumbar pad is mounted on a stiff foam framesheet (e.g., shown in FIGS. 3-4) or on a suspended trampoline back panel, as examples. Even further, in a number of embodiments, the component or lumbar pad provides variable resistance, cushioning, weight transfer, or a combination thereof, for example, to the lower back of the user. FIGS. 7 and 8 illustrate examples of pressure maps of lumbar pads. These lumbar pads may have multiple harnesses or densities within the layered lattice structure.

In some embodiments, the component or lumbar pad includes a lattice structure. An example is shown in FIGS. 5 and 6. Further, in various embodiments, the lattice structure allows airflow (e.g., for ventilation), for instance, between the (e.g., body of the) backpack or lumbar pad and the user's body. Still further, in a number of embodiments, the lattice structure provides cushioning. For example, as mentioned, FIGS. 7 and 8 illustrate examples of pressure maps of lumbar pads. Even further, in some embodiments, the component or lumbar pad includes multiple layers of lattice structure. An example is shown in FIGS. 5 and 6, for instance, which shows four layers of lattice structure. In various embodiments, the component or lumbar pad includes at least three layers of lattice structure, at least four layers of lattice structure, or at least five (or more) layers of lattice structure, as examples. Further still, in particular embodiments, the component or lumbar pad includes two layers of lattice structure, three layers of lattice structure, four layers of lattice structure (e.g., shown in FIGS. 5 and 6), or five layers of lattice structure, or even more layers of lattice structure, as examples. Other embodiments have 6, 7, 8, 9, 10, or 12 layers of lattice structure, as other examples.

In a number of embodiments, the component or lumbar pad includes a network of beams and nodes, for example, that create cells. An example is shown in FIGS. 5 and 6. Further, in some embodiments, including in the embodiment shown in FIGS. 5 and 6, the beams connect to each other at the nodes. In various embodiments, the beams are straight between nodes. In other embodiments, beams may have a slight curve or camber. Moreover, in a number of embodiments, the beams and nodes are monolithic meaning they are all fabricated from the same piece of (e.g., 3D printed) material (e.g., plastic or polymer). Again, an example is shown in FIGS. 5 and 6. In some embodiments, multiple different layers of lattice structure are monolithic. Further, in particular embodiments, all layers of the lattice structure are monolithic. Still further, in various embodiments, the cells (e.g., cells not at the edge of the component or lumbar pad) are triangular, rectangular, square, pentagonal, hexagonal, heptagonal, octagonal, nonagonal, or decagonal, as examples. An example is shown in FIGS. 5 and 6 where most of the cells are hexagonal. In this embodiment, some cells at the edge have fewer sides than cells that are not at the edge. Even further, in a number of embodiments, the cells are (e.g., regular) polygons. An example is shown in FIGS. 5 and 6 where (e.g., interior) cells are hexagonal. Further still, in some embodiments, the component or lumbar pad includes multiple layers of lattice structure and the cells substantially line up in the multiple layers of lattice structure. As used herein, cells are considered to substantially line up if they line up to within the thickness of the beams. In other embodiments, cells line up to within one half, two times, three times, or four times the thickness of the beams, as other examples. Even further still, in particular embodiments, cells that substantially line up have equal numbers of sides or, in certain embodiments, at least a majority of cells that substantially line up have equal numbers of sides or at least 80 percent of cells that substantially line up have equal numbers of sides, as examples. Again an example is shown in FIGS. 5 and 6 where (e.g., interior) cells are hexagonal, substantially line up, and have equal numbers of sides (i.e., in the multiple layers of lattice structure).

In many embodiments, the component or lumbar pad is anatomically shaped, for example, to match and fit the shape of the user's body. Examples of such lumbar pads are shown in FIGS. 1, 2, 5, and 9-26. Further, in a number of embodiments, the component or lumbar pad is attached to a rigid plate, to an open mesh, or to a foam base, as examples. Examples are shown and described herein. Even further, in various embodiments, the component or lumbar pad is attached with adhesive. FIG. 6 shows examples of glue areas for a lumbar pad, for instance. In a number of embodiments, the component or lumbar pad is attached (e.g., in addition to or instead of adhesive) with, for example, lugs, buttons, at least one strap, multiple straps, or a combination thereof, as examples. In still other aspects, the lumbar pad may be attached using welds, such as, sonic welds or fusion welds. Examples of lugs are shown at the top of FIG. 6, for instance. Even further still, in some embodiments, the component or lumbar pad includes a center with an elongated hole in the center. FIGS. 8-14 and 21-25 show lumbar pads with such a hole. FIGS. 11, 14, 21, and 22, in particular, illustrate examples of this hole. Moreover, in particular embodiments, the elongated hole in the center is oriented vertically (e.g., when the backpack is being worn by the user and the user is standing upright). Again, FIGS. 8-14 and 21-25 show examples with such a hole.

Still further specific embodiments include various systems for providing custom (e.g., size) backpacks. Examples of backpacks are shown in FIGS. 1, 2, 20, and 26. In various embodiments, for example, the system for providing custom (e.g., size) backpacks provides backpacks or lumbar pads (e.g., shown in FIGS. 5, 6, and 9-26), as examples. Further, in a number of embodiments, the system includes a website, for instance, where consumers enter through the website at least one consumer body dimension. Still further, in various embodiments, the system fabricates at least one component of a custom backpack using the at least one consumer body dimension (e.g., entered by the consumer). An example of such a component is a lumbar pad (e.g., examples shown in FIGS. 5, 6, and 9-26). In various embodiments, the system (e.g., automatically) fabricates the (e.g., at least one) component (e.g., lumbar pad) of the custom backpack using 3D printing, for example. Even further, in particular embodiments, consumers enter (e.g., via the website) a desired load capacity of the backpack and the system (e.g., automatically) fabricates the (e.g., at least one) component of the custom backpack using the desired load capacity of the backpack (e.g., provided by the consumer).

Other embodiments include an apparatus or method of obtaining or providing an apparatus or information, for instance, that include a novel combination of the features described herein. Even further embodiments include at least one means for accomplishing at least one functional aspect described herein. The subject matter described herein includes various means for accomplishing the various functions or acts described herein or that are apparent from the structure, system, and acts described. Each function described herein is also contemplated as a means for accomplishing that function, or where appropriate, as a step for accomplishing that function. Moreover, various embodiments include certain (e.g., combinations of) aspects described herein. All novel combinations are potential embodiments. Some embodiments may include a subset of elements described herein and various embodiments include additional elements as well. Various methods include various combinations of acts described herein. All feasible combinations are contemplated.

Further, various embodiments of the subject matter described herein include various combinations of the acts, structure, components, and features described herein, shown in the drawings, described in any documents that are incorporated by reference herein, or that are known in the art. Moreover, certain procedures can include acts such as manufacturing, obtaining, or providing components that perform functions described herein or in the documents that are incorporated by reference. Further, as used herein, the word "or," except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

EXAMPLE OF THE TECHNOLOGY INCLUDE

1. A backpack for carrying items on the back of a user, the backpack comprising at least one component that has been manufactured using 3D printing.
2. The backpack of claim 1 wherein the at least one component comprises a lumbar pad.
3. The backpack of claim 1 or claim 2 wherein the at least one component comprises at least part of a shoulder harness.
4. The backpack of any of the preceding claims wherein the at least one component comprises at least part of a hip belt.
5. The backpack of any of the preceding claims wherein the at least one component comprises at least part of a back panel.
6. The backpack of any of the preceding claims, the backpack further comprising a lumbar pad.
7. The backpack of any of the preceding claims, the backpack further comprising a shoulder harness.
8. The backpack of any of the preceding claims, the backpack further comprising a hip belt.
9. The backpack of any of the preceding claims, the backpack further comprising a back panel.
10. The backpack of any of the preceding claims, the backpack further comprising a three-dimensional back panel.
11. The backpack of any of the preceding claims, the backpack further comprising a body for containing the items.
12. The backpack of any of the preceding claims, the backpack further comprising a mesh panel.
13. The backpack of any of the preceding claims, the backpack further comprising a plastic sheet.
14. The backpack of any of the preceding claims, the backpack further comprising multiple foam pads.
15. The backpack of any of the preceding claims, the backpack further comprising: a three-dimensional back panel; a body for containing the items; a mesh panel; a plastic sheet; and multiple foam pads; wherein: the three-dimensional back panel creates a space between the mesh panel and the plastic sheet using the multiple foam pads to separate the body of the backpack from the user's back.

16. A lumbar pad for supporting a load on the lumbar region of a user, wherein the lumbar pad has been manufactured using 3D printing.
17. The backpack or lumbar pad of any of the preceding claims wherein the component or lumbar pad is shaped like an isosceles trapezoid.
18. The backpack or lumbar pad of any of the preceding claims wherein the component or lumbar pad is shaped like a rounded isosceles trapezoid.
19. The backpack or lumbar pad of any of the preceding claims wherein the component or lumbar pad is mounted on a stiff foam framesheet.
20. The backpack or lumbar pad of any of the preceding claims wherein the component or lumbar pad is mounted on a suspended trampoline back panel.
21. The backpack or lumbar pad of any of the preceding claims wherein the component or lumbar pad provides variable resistance, cushioning, and weight transfer to the lower back of the user.
22. The backpack or lumbar pad of any of the preceding claims wherein the component or lumbar pad comprises a lattice structure.
23. The backpack or lumbar pad of claim 22 wherein the lattice structure allows airflow for ventilation between the backpack or lumbar pad and the user's body.
24. The backpack or lumbar pad of claim 22 or claim 23 wherein the lattice structure provides cushioning.
25. The backpack or lumbar pad of any of the preceding claims wherein the component or lumbar pad comprises multiple layers of lattice structure.
26. The backpack or lumbar pad of any of the preceding claims wherein the component or lumbar pad comprises at least three layers of lattice structure.
27. The backpack or lumbar pad of any of the preceding claims wherein the component or lumbar pad comprises at least four layers of lattice structure.
28. The backpack or lumbar pad of any of the preceding claims wherein the component or lumbar pad comprises at least five layers of lattice structure.
29. The backpack or lumbar pad of any of the preceding claims wherein the component or lumbar pad comprises two layers of lattice structure.
30. The backpack or lumbar pad of any of the preceding claims wherein the component or lumbar pad comprises three layers of lattice structure.
31. The backpack or lumbar pad of any of the preceding claims wherein the component or lumbar pad comprises four layers of lattice structure.
32. The backpack or lumbar pad of any of the preceding claims wherein the component or lumbar pad comprises five layers of lattice structure.
33. The backpack or lumbar pad of any of the preceding claims wherein the component or lumbar pad includes a network of beams and nodes that create cells.
34. The backpack or lumbar pad of claim 33 wherein the beams connect to each other at the nodes.
35. The backpack or lumbar pad of claim 33 or claim 34 wherein the beams and nodes are monolithic.
36. The backpack or lumbar pad of any of claims 33 to 35 wherein the cells are triangular.
37. The backpack or lumbar pad of any of claims 33 to 35 wherein the cells are rectangular.
38. The backpack or lumbar pad of any of claims 33 to 35 wherein the cells are square.
39. The backpack or lumbar pad of any of claims 33 to 35 wherein the cells are pentagonal.
40. The backpack or lumbar pad of any of claims 33 to 35 wherein the cells are hexagonal.
41. The backpack or lumbar pad of any of claims 33 to 35 wherein the cells are heptagonal.
42. The backpack or lumbar pad of any of claims 33 to 35 wherein the cells are octagonal.
43. The backpack or lumbar pad of any of claims 33 to 35 wherein the cells are nonagonal.
44. The backpack or lumbar pad of any of claims 33 to 35 wherein the cells are decagonal.
45. The backpack or lumbar pad of any of claims 33 to 44 wherein the cells are regular polygons.
46. The backpack or lumbar pad of any of claims 33 to 45 wherein: the component or lumbar pad comprises multiple layers of lattice structure; and the cells substantially line up in the multiple layers of lattice structure.
47. The backpack or lumbar pad of claim 46 wherein cells that substantially line up have equal numbers of sides.
48. The backpack or lumbar pad of claim 46 wherein at least a majority of cells that substantially line up have equal numbers of sides.
49. The backpack or lumbar pad of claim 46 wherein at least 80 percent of cells that substantially line up have equal numbers of sides.
50. The backpack or lumbar pad of any of the preceding claims wherein: the component or lumbar pad is anatomically shaped to match and fit the shape of the user's body.
51. The backpack or lumbar pad of any of the preceding claims wherein the component or lumbar pad is attached to a rigid plate.
52. The backpack or lumbar pad of any of the preceding claims wherein the component or lumbar pad is attached to an open mesh.
53. The backpack or lumbar pad of any of the preceding claims wherein the component or lumbar pad is attached to a foam base.
54. The backpack or lumbar pad of any of the preceding claims wherein the component or lumbar pad is attached with adhesive.
55. The backpack or lumbar pad of any of the preceding claims wherein the component or lumbar pad is attached with lugs.
56. The backpack or lumbar pad of any of the preceding claims wherein the component or lumbar pad is attached with buttons.
57. The backpack or lumbar pad of any of the preceding claims wherein the component or lumbar pad is attached with at least one strap.
58. The backpack or lumbar pad of any of the preceding claims wherein the component or lumbar pad comprises a center with an elongated hole in the center.
59. The backpack or lumbar pad of claim 58 wherein the elongated hole in the center is oriented vertically when the backpack is being worn by the user and the user is standing upright.
60. A system for providing custom backpacks, wherein the system for providing custom backpacks provides backpacks or lumbar pads of any of the preceding claims.
61. The system for providing custom backpacks of claim 60 comprising a website wherein: consumers enter through the website at least one consumer body dimension; and the system fabricates at least one component of a custom backpack using the at least one consumer body dimension entered by the consumer.

62. A system for providing custom backpacks, wherein the system comprises a website and consumers enter through the website at least one consumer body dimension and the system fabricates at least one component of a custom backpack using the at least one consumer body dimension entered by the consumer.

63. The system for providing custom backpacks of any of claims 60 to 62 comprising a website wherein consumers enter via the website a desired load capacity of the backpack and the system fabricates at least one component of the custom backpack using the desired load capacity of the backpack provided by the consumer.

64. The system for providing custom backpacks of any of claims 60 to 63 wherein the system fabricates the at least one component of the custom backpack using 3D printing.

65. The system for providing custom backpacks of any of claims 60 to 64 wherein the at least one component of the custom backpack comprises a lumbar pad.

The invention claimed is:

1. A backpack comprising:
    at least one adjustable harness;
    at least one hip belt;
    a back panel extending in a vertical direction from the at least one adjustable harness to the at least one hip belt; and
    a lumbar pad coupled to the back panel, wherein the lumbar pad is located proximal to the at least one hip belt and distal the at least one adjustable harness, wherein the lumbar pad is constructed of a lattice, the lattice having a plurality of hardnesses such that a top portion of the lumbar pad has a first hardness and a bottom portion of the lumbar pad has a second hardness wherein the second hardness is greater than the first hardness, wherein the lumbar pad includes a center region having a third hardness and at least a first boundary area extending around at least a portion of the center region, wherein the first boundary area has a fourth hardness and the third hardness is greater than the fourth hardness.

2. The backpack of claim 1, wherein the lumbar pad comprises a ribbon base having a width extending around a perimeter of the lumbar pad and wherein the lattice is on and bonded to the ribbon base.

3. The backpack of claim 2, wherein the first hardness is between about 20 to about 31 newtons and wherein the second hardness is between about 20 and 51 newtons.

4. The backpack of claim 3, wherein the third hardness is between about 23 to 51 newtons and wherein the fourth hardness is between about 17 and 47 newtons.

5. The backpack of claim 4, wherein the lattice comprises a plurality of beams.

6. The backpack of claim 5, wherein the plurality of beams comprises a plurality of curved beams forming nodes and a plurality of straight beams forming branches to interconnect the plurality of beams.

7. The backpack of claim 6 further comprising a second pad located in either the at least one harness or the at least one hip belt.

8. The backpack of claim 1, wherein the lumbar pad comprises a ribbon base having a width extending around a perimeter of the lumbar pad and wherein the lattice is on and bonded to the ribbon base.

9. The backpack of claim 1, wherein the first hardness is between about 20 to about 31 newtons and wherein the second hardness is between about 20 and 51 newtons.

10. The backpack of claim 1, wherein the lattice comprises a plurality of beams.

11. The backpack of claim 10, wherein the plurality of beams comprises a plurality of curved beams forming nodes and a plurality of straight beams forming branches to interconnect the plurality of beams.

12. The backpack claim 1, further comprising a second pad located in either the at least one harness or the at least one hip belt.

13. A backpack comprising:
    at least one adjustable harness;
    at least one hip belt;
    a back panel extending in a vertical direction from the at least one adjustable harness to the at least one hip belt; and
    a lumbar pad coupled to the back panel, wherein the lumbar pad is located proximal to the at least one hip belt and distal the at least one adjustable harness, wherein the lumbar pad having a lattice structure including beams and nodes, wherein the beams and nodes are formed into layers, and the lumbar pad having a plurality of hardnesses such that a top portion of the lumbar pad has a first hardness and a bottom portion of the lumbar pad has a second hardness wherein the second hardness is greater than the first hardness.

14. The backpack of claim 13, wherein each hardness for the lumbar pad is based on material from which the lumbar pad is constructed, density of the layers, and construction of the beams and nodes.

15. The backpack of claim 13, wherein the lumbar pad includes a center region having a third hardness and at least a first boundary area extending around at least a portion of the center region, wherein the first boundary area has a fourth hardness and the third hardness is greater than the fourth hardness.

16. The backpack of claim 13, wherein the lumbar pad comprises a ribbon base having a width extending around a perimeter of the lumbar pad and wherein the lattice is on and bonded to the ribbon base.

17. The backpack of claim 13, wherein the beams comprises a plurality of curved beams forming the nodes and a plurality of straight beams forming branches to interconnect the plurality of beams.

\* \* \* \* \*